US012469956B2

(12) United States Patent
Wang et al.

(10) Patent No.: US 12,469,956 B2
(45) Date of Patent: Nov. 11, 2025

(54) ANTENNA ARRAY, ANTENNA MODULE, AND ELECTRONIC DEVICE

(71) Applicant: Huawei Technologies Co., Ltd., Shenzhen (CN)

(72) Inventors: Yongchao Wang, Xi'an (CN); Yu Yao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 18/558,045

(22) PCT Filed: Apr. 18, 2022

(86) PCT No.: PCT/CN2022/087471
§ 371 (c)(1),
(2) Date: Oct. 30, 2023

(87) PCT Pub. No.: WO2022/228188
PCT Pub. Date: Nov. 3, 2022

(65) Prior Publication Data

US 2024/0222845 A1 Jul. 4, 2024

(30) Foreign Application Priority Data

Apr. 30, 2021 (CN) ........................ 202110482045.7

(51) Int. Cl.
*H01Q 1/22* (2006.01)
*H01Q 1/24* (2006.01)
(Continued)

(52) U.S. Cl.
CPC .......... *H01Q 1/2283* (2013.01); *H01Q 1/243* (2013.01); *H01Q 5/40* (2015.01); *H01Q 21/065* (2013.01); *H01Q 21/08* (2013.01); *H01Q 23/00* (2013.01)

(58) Field of Classification Search
CPC .. H01Q 1/2258; H01Q 1/2266; H01Q 1/2283; H01Q 1/24; H01Q 1/243;
(Continued)

(56) References Cited

U.S. PATENT DOCUMENTS 10,714,840 B1 7/2020 West et al.
2009/0135078 A1 5/2009 Lindmark et al.
(Continued)

FOREIGN PATENT DOCUMENTS

CN 111064012 A 4/2020

*Primary Examiner* — Robert Karacsony
(74) *Attorney, Agent, or Firm* — Conley Rose, P.C.

(57) ABSTRACT

An antenna array includes a plurality of first antenna elements and second antenna element(s). The first antenna elements operate at least in a first frequency band and a second frequency band, and any frequency in the second frequency band is higher than any frequency in the first frequency band. The second antenna element(s) operate at least in a third frequency band, and the third frequency band at least partially overlaps the second frequency band. The first antenna elements are arranged at intervals, and the second antenna element(s) is/are disposed between at least two adjacent first antenna elements. A center distance between every two adjacent first antenna elements is within a preset size range, so that a gain of the antenna array in the first frequency band is greater than or equal to a target value.

18 Claims, 13 Drawing Sheets

(51) Int. Cl.

| | |
|---|---|
| ***H01Q 5/40*** | (2015.01) |
| ***H01Q 5/42*** | (2015.01) |
| ***H01Q 21/06*** | (2006.01) |
| ***H01Q 21/08*** | (2006.01) |
| ***H01Q 23/00*** | (2006.01) |

(58) Field of Classification Search

CPC ............ H01Q 1/246; H01Q 5/40; H01Q 5/42; H01Q 5/48; H01Q 5/49; H01Q 21/06; H01Q 21/061; H01Q 21/065; H01Q 21/08; H01Q 23/00

See application file for complete search history.

(56) References Cited

U.S. PATENT DOCUMENTS

2012/0280880 A1* 11/2012 Arvidsson .............. H01Q 1/246 343/810
2019/0173177 A1 6/2019 Johansson et al.
2019/0386393 A1* 12/2019 Chiang .................... H01Q 5/28
2020/0106158 A1* 4/2020 Gomez Angulo .... G06F 1/1698

* cited by examiner

ANTENNA ARRAY, ANTENNA MODULE, AND ELECTRONIC DEVICE

CROSS-REFERENCE TO RELATED APPLICATIONS

This is a National Stage of International Patent Application No. PCT/CN2022/087471 filed on Apr. 18, 2022, which claims priority to Chinese Patent Application No. 202110482045.7 filed on Apr. 30, 2021, both of which are hereby incorporated by reference in their entireties.

TECHNICAL FIELD

Embodiments of this application relate to the field of wireless communication, and in particular, to an antenna array, an antenna module, and an electronic device.

BACKGROUND

With development of communication technologies, a shared-aperture antenna array is widely used in various electronic devices, and a corresponding antenna array can cover a plurality of frequency bands, to implement a feature of multi-frequency band scanning. However, in a conventional antenna array, to enable a gain of low-frequency band scanning to meet a corresponding requirement, a center distance between corresponding antenna elements needs to be appropriately increased. However, with the center distance, a scanning angle of a high frequency band of the antenna array is small. Therefore, it is hardly to meet a requirement of wide-angle scanning.

SUMMARY

This application provides an antenna array, an antenna module, and an electronic device, to meet a gain requirement of low-frequency band scanning, and effectively implement a feature of wide-angle scanning in a high frequency band.

To achieve the foregoing technical objective, the following technical solutions are used in this application.

According to a first aspect, this application provides an antenna array. The antenna array includes first antenna elements and second antenna element(s). The first antenna elements operate at least in a first frequency band and a second frequency band, and any frequency in the second frequency band is higher than any frequency in the first frequency band. The second antenna element(s) operate at least in a third frequency band, and the third frequency band at least partially overlaps the second frequency band. There are a plurality of first antenna elements, the plurality of first antenna elements are arranged at intervals, and the second antenna element(s) are disposed between at least two adjacent first antenna elements. A center distance between every two adjacent first antenna elements is within a preset size range, so that a gain of the antenna array in the first frequency band is greater than or equal to a target value.

The first frequency band and the second frequency band may cover various frequency ranges, provided that any frequency in the second frequency band is higher than any frequency in the first frequency band. For example, the first frequency band may be considered as a low frequency band, and the second frequency band may be considered as a high frequency band. For example, the first frequency band is a full-coverage frequency band that includes a frequency band n257 and a frequency band n258. For example, a frequency range covered by the first frequency band is 24.25 GHz to 27.5 GHz. The second frequency band is a full-coverage frequency band that includes a frequency band n259 and a frequency band n260. For example, a frequency range covered by the second frequency band is 37 GHz to 43.5 GHZ.

The third frequency band may cover various frequency ranges, provided that the third frequency band at least partially overlaps the second frequency band. It may be understood that, compared with the first frequency band, an overlapping frequency band between the second frequency band and the third frequency band may also be considered as a high frequency band. However, in this embodiment, because both the first antenna elements and the second antenna element(s) operate in the overlapping frequency band, and a center distance between each first antenna element and each second antenna element is small, the antenna array can effectively implement a feature of wide-angle scanning in the overlapping frequency band. It may be understood that the first frequency band, the second frequency band, and the third frequency band may cover various frequency ranges. The frequency ranges covered by the first frequency band, the second frequency band, and the third frequency band are not specifically limited herein.

When the antenna array operates in the first frequency band, when the center distance between every two adjacent first antenna elements is larger, gain performance of the antenna array in the low frequency band is better. In addition, it can be learned from a related theory of antenna radiation that when the center distance between every two adjacent first antenna elements is excessively large, grating lobes are generated in an antenna directivity pattern corresponding to the antenna array, resulting in reduced performance of the antenna array. Based on this, the center distance between every two adjacent first antenna elements should be set within the preset size range, to avoid generation of grating lobes and effectively improve the gain of the antenna array in the first frequency band.

When the first antenna elements operate in the overlapping frequency band between the second frequency band and the third frequency band, the second antenna element(s) that also operate in the overlapping frequency band are inserted between two adjacent first antenna elements, so that a scanning angle of the antenna array in the overlapping frequency band can be increased, to effectively implement a feature of wide-angle scanning in a high frequency band. It should be further noted that, to enable a gain of the antenna array in the overlapping frequency band to meet a corresponding requirement, the center distance between each first antenna element and each second antenna element that are adjacent should be set to an appropriate value.

In the antenna array provided in this application, a plurality of first antenna elements are arranged at intervals, and the center distance between every two adjacent first antenna elements is set within the preset size range, so that the gain of the antenna array in the first frequency band is greater than or equal to the target value, to meet a requirement of a low frequency band gain. In addition, the second antenna element(s) are disposed between at least two adjacent first antenna elements, and the third frequency band of the second antenna element(s) at least partially overlaps the second frequency band of the first antenna elements, so that a distance between antenna elements in a high frequency band is reduced. Therefore, the scanning angle of the antenna array in a high frequency band is improved, to effectively implement a feature of wide-angle scanning in a high frequency band.

In a possible implementation, the preset size range is greater than or equal to 0.45 times a wavelength corresponding to the first frequency band and less than or equal to 0.8 times the wavelength corresponding to the first frequency band. The wavelength corresponding to the first frequency band is a wavelength $\lambda_1$ corresponding to a center frequency of the first frequency band. Based on this, a physical length range of the center distance between every two adjacent first antenna elements is $0.45\lambda_1$ to $0.8\lambda_1$, and a corresponding electrical length range is 0.45 to 0.8. In a specific embodiment, a physical length of the center distance between every two adjacent first antenna elements is $0.5\lambda_1$. When the center distance between every two adjacent first antenna elements is within the preset range, the gain of the antenna array in the first frequency band can be greater than or equal to the target value, so that a requirement of a low frequency band gain is met, and generation of grating lobes can be effectively avoided.

In a possible implementation, the target value is 8 dBi. It may be understood that, when the gain of the antenna array in the first frequency band is greater than or equal to 8 dBi, a gain of the antenna array in a low frequency band can meet a corresponding requirement.

In a possible implementation, the plurality of first antenna elements are linearly arranged, and at least one second antenna element is disposed between every two adjacent first antenna elements. It may be understood that, in the foregoing structure, the formed antenna array is linearly arranged, has a small size, and can be effectively used in an electronic device with a small size, for example, a mobile phone or a tablet.

In a possible implementation, one second antenna element is disposed between every two adjacent first antenna elements, and center distances between the second antenna element and the two adjacent first antenna elements are the same. When only one second antenna element is disposed between every two adjacent first antenna elements, the second antenna element equally divides a center distance between the two adjacent first antenna elements, to effectively improve symmetry of the antenna array during scanning in a high frequency band.

In a possible implementation, a frequency range in which the second frequency band overlaps the third frequency band is an overlapping frequency band; and the center distance between each first antenna element and the second antenna element that are adjacent is greater than or equal to 0.3 times a wavelength corresponding to the overlapping frequency band, and is less than or equal to 0.45 times the wavelength corresponding to the overlapping frequency band. The wavelength corresponding to the overlapping frequency band is a wavelength $\lambda_0$ corresponding to a center frequency of the overlapping frequency band. Based on this, a physical length range of the center distance between the first antenna element and the second antenna element that are adjacent is $0.3\lambda_0$ to $0.45\lambda_0$, and a corresponding electrical length range is 0.3 to 0.45. When the center distance between the first antenna element and the second antenna element that are adjacent is within the foregoing size range, the gain of the antenna array in the foregoing overlapping frequency band can meet a corresponding requirement, and the scanning angle of the antenna array in the overlapping frequency band can be improved, so that a feature of wide-angle scanning in a high frequency band is effectively implemented. In a specific embodiment, a physical length of the center distance between every two adjacent first antenna elements is $0.37\lambda_0$.

In a possible implementation, the first frequency band is 24.25 GHz to 29.5 GHZ, and the second frequency band and the third frequency band are both 37 GHz to 43.5 GHZ. It may be understood that, the third frequency band and the second frequency band cover a same frequency range. For example, it may be considered that both the first antenna elements and the second antenna element(s) may operate in the second frequency band, so that the antenna array can effectively implement a feature of wide-angle scanning in a high frequency band of 37 GHZ to 43.5 GHZ.

In a possible implementation, the center distance between two adjacent first antenna elements is 5.6 mm, and the center distance between the first antenna element and the second antenna element that are adjacent is 2.8 mm. When the center distances between the second antenna element and the two adjacent first antenna elements are both 2.8 mm, the scanning symmetry of the antenna array can be improved, and the antenna array can be further enabled to meet a gain requirement of scanning in the first frequency band (24.25 GHz to 27.5 GHZ) and the second frequency band (37 GHz to 43.5 GHZ), and effectively implement a feature of wide-angle scanning in the second frequency band.

In a possible implementation, a plurality of second antenna elements are disposed between every two adjacent first antenna elements, and a center distance between every two adjacent second antenna elements is equal to a center distance between each first antenna element and each second antenna element that are adjacent. When the first antenna elements operate in the first frequency band and the second frequency band, the second antenna elements operate in the second frequency band, and a phase difference between a frequency covered by the first frequency band and a frequency covered by the second frequency band is large, the plurality of second antenna elements may be inserted between two adjacent first antenna elements, to improve radiation performance of the antenna array. It may be further understood that, in the foregoing structure, the center distance between every two adjacent second antenna elements may be equal to the center distance between the first antenna element and the second antenna element that are adjacent, so that symmetry of the antenna array in the second frequency band is effectively improved.

In a possible implementation, two second antenna elements are disposed between every two adjacent first antenna elements; a frequency range in which the second frequency band overlaps the third frequency band is an overlapping frequency band; and the center distance between the first antenna element and the second antenna element that are adjacent is greater than or equal to 0.3 times a wavelength corresponding to the overlapping frequency band, and is less than or equal to 0.45 times the wavelength corresponding to the overlapping frequency band. It may be understood that, when two second antenna elements are disposed between every two adjacent first antenna elements, and the center distance between the first antenna element and the second antenna element that are adjacent and a center distance between two adjacent second antenna elements are both within the foregoing distance range, the scanning angle of the antenna array in a high frequency band can be effectively increased, to effectively implement a feature of wide-angle scanning. For example, in this implementation, the first frequency band is 24.25 GHZ to 29.5 GHz, and the second frequency band is 57 GHz to 64 GHZ.

In a possible implementation, the first frequency band is 24.25 GHz to 29.5 GHz. and the second frequency band and the third frequency band are both 122 GHz to 123 GHZ. It may be understood that 122 GHz to 123 GHZ belong to a radar frequency band. When an antenna array 100 operates in the frequency band, a requirement on a scanning angle is relatively low. Even if an electrical length of a center distance between antenna elements is small, a corresponding function requirement can be met.

In a possible implementation, the antenna array is axi-symmetrically distributed with respect to a virtual symmetry axis, and the symmetry axis is perpendicular to an extension direction of the antenna array. When the antenna array is symmetrically distributed, scanning symmetry of the antenna array can be effectively improved, so that the antenna array has good scanning performance. It should be further noted that a same feeding signal may be fed into antenna elements that are symmetrically distributed with respect to the foregoing symmetry axis, so that the antenna array is symmetrical in structure and also symmetrical in signal distribution, to further improve the scanning symmetry of the antenna array.

In a possible implementation, the plurality of first antenna elements are planarly arranged, and at least one second antenna element is disposed between every two adjacent first antenna elements. It may be understood that, when the antenna array is planarly arranged of m×n (m>1, n>1), the antenna array usually includes a large quantity of first antenna elements and a large quantity of second antenna elements, so that good antenna radiation performance can be obtained.

In a possible implementation, the second antenna element (s) are multi-frequency band antenna element(s), and the second antenna element(s) operate in a plurality of frequency bands, including, but not limited to, the third frequency band. It may be understood that, when the second antenna element(s) are multi-frequency band antennas, the antenna array formed by the first antenna elements and the second antenna element(s) can operate in more frequency bands, so that good antenna radiation performance is obtained.

In a possible implementation, the first antenna elements are multi-frequency band antenna elements, and the first antenna elements operate in a plurality of frequency bands, including, but not limited to, the first frequency band and the second frequency band. It may be understood that, when the first antenna elements are multi-frequency band antennas, the antenna array formed by the first antenna elements and the second antenna element(s) can also operate in more frequency bands, so that good antenna radiation performance is obtained.

In a possible implementation, the first antenna elements and the second antenna element(s) are patch antennas; two first feeding ports are disposed on each first antenna element to feed a feeding signal, and the two first feeding ports are disposed at an interval to form a dual-polarized patch antenna; and two second feeding ports are disposed on each second antenna element to feed a feeding signal, and the two second feeding ports are disposed at an interval to form a dual-polarized patch antenna.

In a possible implementation, the first antenna elements and the second antenna element(s) are dielectric resonant antennas; each first antenna element includes a first non-metal dielectric block and two first feeding ports disposed on the first non-metal dielectric block, the two first feeding ports are both configured to feed a feeding signal, and the two first feeding ports are disposed at an interval to form a dual-polarized dielectric resonant antenna; and each second antenna element includes a second non-metal dielectric block and two second feeding ports disposed on the second non-metal dielectric block, the two second feeding ports are both configured to feed a feeding signal, and the two second feeding ports are disposed at an interval to form a dual-polarized dielectric resonant antenna.

It should be noted that, regardless of whether the first antenna elements and the second antenna element(s) are patch antennas or dielectric resonant antennas, an antenna array formed by the first antenna elements and the second antenna element(s) can meet an antenna performance requirement in a corresponding frequency band. It may be further understood that types of the first antenna elements and the second antenna element(s) include, but are not limited to, patch antennas and dielectric resonant antennas, and may be any other antenna type that meets a corresponding function requirement. The types of the first antenna elements and the second antenna element(s) are not specifically limited herein.

According to a second aspect, this application further provides an antenna module. The antenna module includes a substrate, a chip, and the antenna array according to any one of the implementations of the first aspect. Both the antenna array and the chip are connected to the substrate, and the chip is electrically connected to the antenna array. The antenna array is configured to receive or transmit an electromagnetic wave, to implement a corresponding radiation function. The chip is electrically connected to the antenna array, to modulate a signal and transmit the signal to the antenna array, or demodulate a signal to obtain corresponding information. The substrate may be formed by a printed circuit board (Printed Circuit Board, PCB) or a flexible circuit board (Flexible Printed Circuit, FPC), and the substrate may be a single-layer board or a multi-layer board. The type and structure of the substrate are not specifically limited in this application.

According to the antenna module provided in this application, the antenna array provided in this embodiment of this application is installed, and the chip is electrically connected to the antenna array, to transmit a corresponding feeding signal to the antenna array, to meet a gain requirement of low-frequency band scanning, and effectively implement a feature of wide-angle scanning in a high frequency band.

In a possible implementation, the chip transmits a first feeding signal or a second feeding signal to first antenna elements, and transmits a third feeding signal to second antenna element(s); a frequency of the first feeding signal falls within a range of a first frequency band; a frequency of the second feeding signal falls within a range of a second frequency band; and a frequency of the third feeding signal falls within a range of a third frequency band. In the foregoing feeding manner, the antenna module can effectively implement multi-frequency band operation.

In a possible implementation, a combiner is further disposed between the chip and the antenna array, and the combiner is configured to combine the first feeding signal and the second feeding signal for transmission to the first antenna elements together. The combiner is disposed, so that feeding electrical signals in a plurality of frequency bands can be fed into the first antenna elements together, and the first antenna elements can implement a multi-frequency band scanning function.

According to a third aspect, this application further provides an electronic device. The electronic device includes the antenna module according to any implementation of the second aspect. The electronic device includes a housing, a motherboard, and the antenna module provided in embodiments of this application. The antenna module is integrated into the housing, to implement a corresponding antenna radiation function. The motherboard is electrically connected to the antenna module, to supply power to the antenna module. It may be understood that the electronic device may be a mobile phone, a tablet, a computer, a large-screen television, customer-premises equipment (Customer-Premises Equipment, CPE), or any other electronic device having an antenna. A type of the electronic device is not specifically limited herein. For the electronic device provided in this embodiment of this application, the antenna module provided in this embodiment of this application is installed, to meet a gain requirement of low-frequency band scanning, and effectively implement a feature of wide-angle scanning in a high frequency band.

DESCRIPTION OF EMBODIMENTS

Figure 1A:
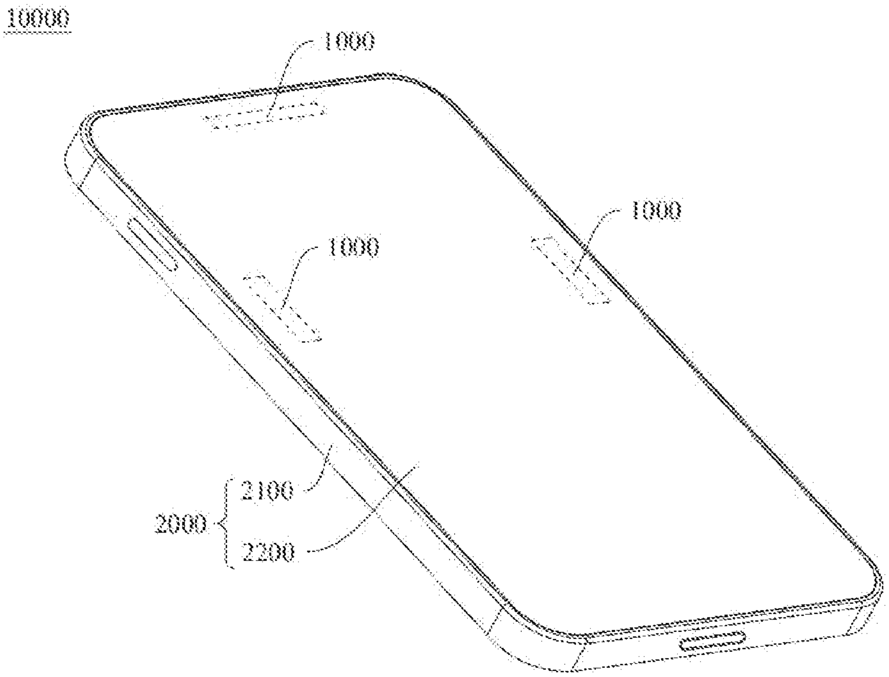
FIG. 1*a* is a schematic diagram of a structure of an electronic device according to an embodiment of this application.

Embodiments of this application are described below with reference to the accompanying drawings in embodiments of this application.

In the descriptions of embodiments of this application, unless otherwise specified. "and/or" in this specification describes merely an association relationship between associated objects and indicates that there may be three relationships. For example, A and/or B may represent the following three cases: Only A exists, both A and B exist, and only B exists. In the descriptions of embodiments of this application, "a plurality of" means two or more. In the description of embodiments of this application, a range of A to B includes endpoints A and B.

Orientation terms mentioned in embodiments of this application, for example, "on", "below", "front", "back", "left", "right", "inside", "outside", "side face", "top", and "bottom", are merely directions based on the accompanying drawings. Therefore, the orientation terms are used to better and more clearly describe and understand embodiments of this application, instead of indicating or implying that a specified apparatus or element needs to have a specific orientation, and be constructed and operated in the specific orientation. Therefore, this cannot be understood as a limitation on embodiments of this application.

It should be understood that, in this application, "electrical connection" may be understood as that components are physically in contact and are electrically conducted, or may be understood as a form in which different components in a line structure are connected through physical lines that can transmit an electrical signal, for example, a printed circuit board (printed circuit board, PCB) copper foil or a conducting wire. Both "connection" and "connected to" may refer to a mechanical connection relationship or a physical connection relationship. For example, a connection between A and B or that A is connected to B may mean that there is a fastening component (for example, a screw, a bolt, a rivet, or the like) between A and B; or A and B are in contact with each other and A and B are difficult to be separated.

In this application. "length" may be understood as a physical length of an object, or may be understood as an electrical length. The electrical length may be represented by multiplying a physical length (for example, a mechanical length or a geometric length) by a ratio of a transmission time of an electrical or electromagnetic signal in a medium to a time required when the signal passes through free space by a distance the same as the physical length of the medium. The electrical length may satisfy the following formula:

$$\overline{L} = L \times \frac{a}{b}.$$

L is the physical length, a is the transmission time of an electrical or electromagnetic signal in a medium, b is the transmission time in free space.

Alternatively, the electrical length may be a ratio of a physical length (for example, a mechanical length or a geometric length) to a wavelength of a transmitted electromagnetic wave. The electrical length may satisfy the following formula:

$$\bar{L} = \frac{L}{\lambda}.$$

L is the physical length, and is the wavelength of the electromagnetic wave.

Connection: Two or more components are conducted or connected in the "electrical connection" or "coupling" manner to perform signal/energy transmission, which may be referred to as connection.

Antenna pattern: The antenna pattern is also referred to as a radiation pattern. The antenna pattern is a pattern in which a relative field strength (a normalized modulus value) of an antenna radiation field changes with a direction at a specific distance from the antenna. The antenna pattern is usually represented by two plane patterns that are perpendicular to each other in a maximum radiation direction of an antenna.

The antenna pattern usually includes a plurality of radiation beams. A radiation beam with the highest radiation intensity is referred to as a main lobe, and other radiation beams are referred to as side lobes. In the side lobes, a side lobe in an opposite direction of the main lobe is also referred to as a back lobe.

Gain: The gain is used for indicating a degree to which an antenna radiates input power in a centralized manner. Generally, when the main lobe of the antenna pattern is narrower, the side lobe is smaller, and the gain is higher.

Antenna return loss: The antenna return loss may be understood as a ratio of a power of a signal reflected back to an antenna port by an antenna circuit to a transmit power of the antenna port. When a power of a reflected signal is lower, a power of a signal radiated from an antenna to the space is higher, and radiation efficiency of the antenna is higher. When the power of the reflected signal is higher, the power of the signal radiated from the antenna to the space is lower, and the radiation efficiency of the antenna is lower.

The antenna return loss may be represented by a parameter S1,1, and the parameter S1,1 is usually a negative number. When the parameter S1,1 is smaller, it indicates that the antenna return loss is lower, and the radiation efficiency of the antenna is higher. When the parameter S1,1 is larger, it indicates that the antenna return loss is higher, and the radiation efficiency of the antenna is lower.

Antenna isolation: The antenna isolation is a ratio of a power of a signal transmitted by one antenna to a power of a signal received by another antenna, and may be represented by parameters S2,1 and S1,2.

Figure 1B:
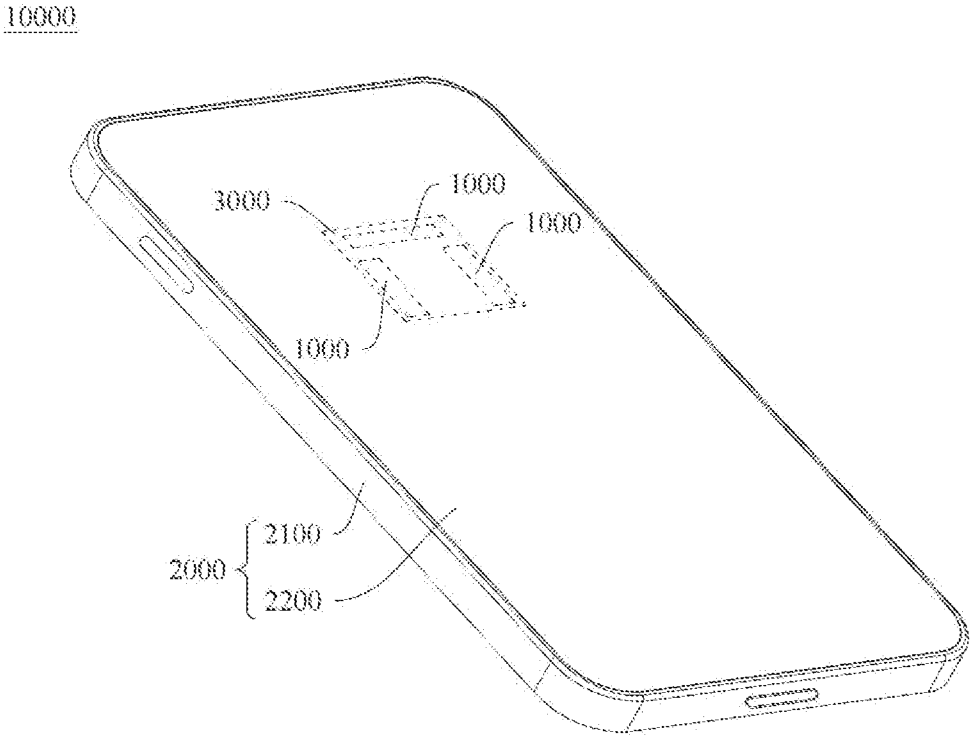
FIG. 1*b* is a schematic diagram of a structure of an electronic device according to another embodiment.
Figure 2:
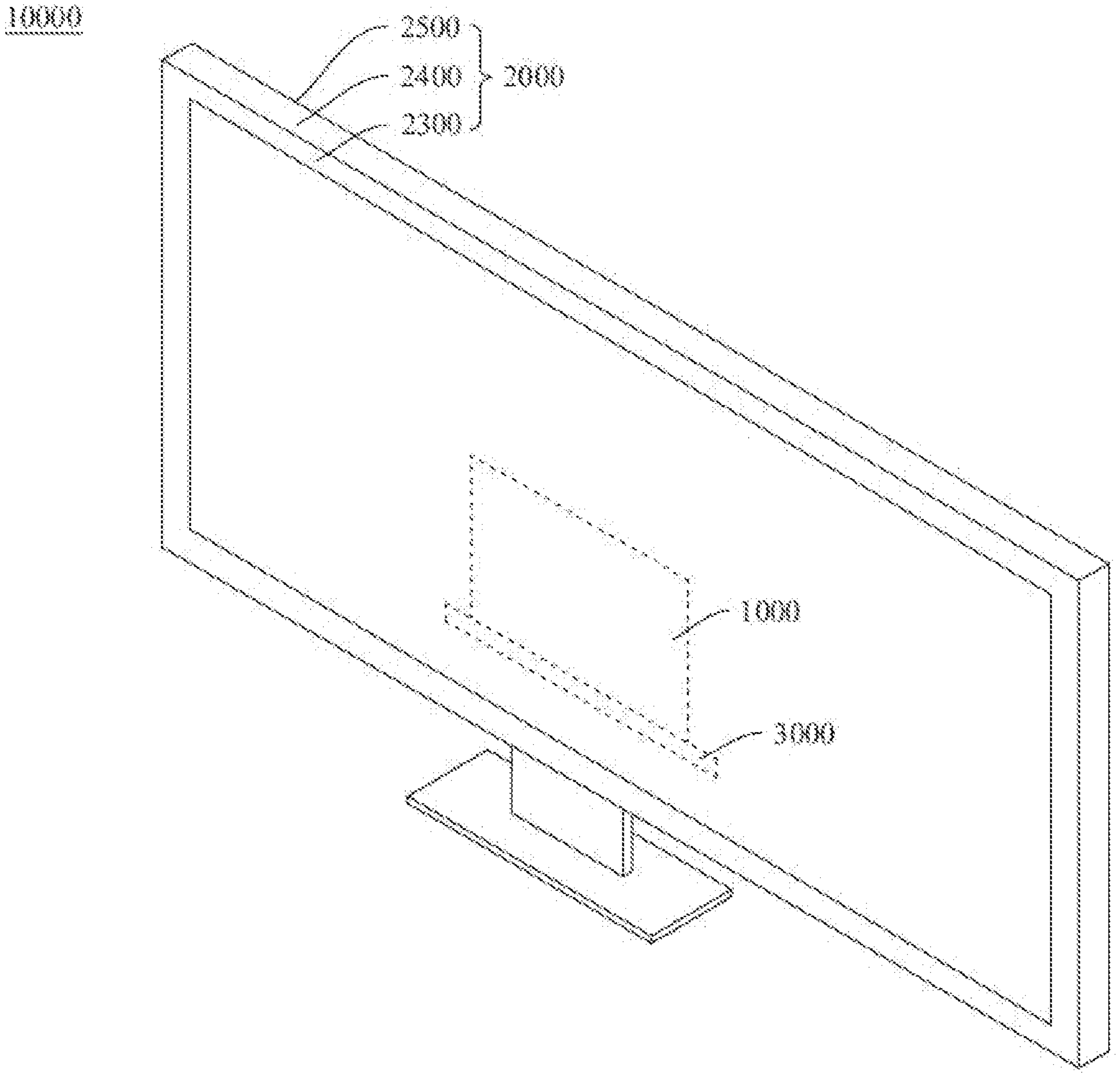
FIG. 2 is a schematic diagram of a structure of an electronic device according to another embodiment.
Figure 3:
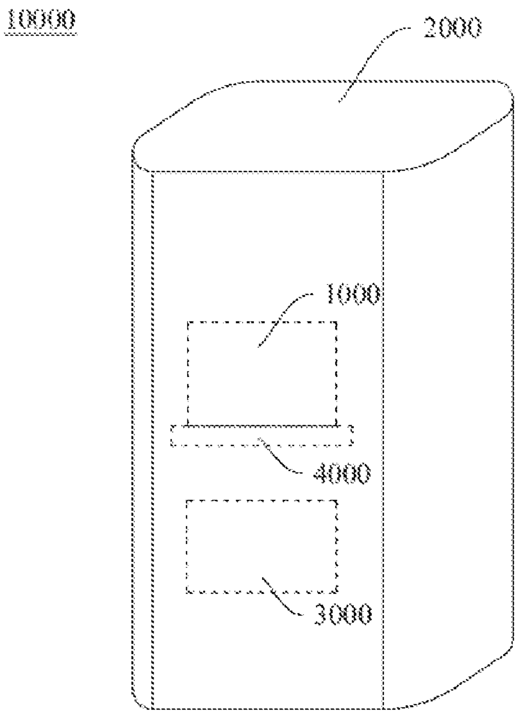
FIG. 3 is a schematic diagram of a structure of an electronic device according to another embodiment.

Refer to FIG. 1*a*, FIG. 1*b*, FIG. 2, and FIG. 3 together. FIG. 1*a* is a schematic diagram of a structure of an electronic device according to an embodiment of this application. FIG. 1*b* is a schematic diagram of a structure of an electronic device according to another embodiment. FIG. 2 is a schematic diagram of a structure of an electronic device according to another embodiment. FIG. 3 is a schematic diagram of a structure of an electronic device according to another embodiment.

An embodiment of this application provides an electronic device 10000. The electronic device 10000 includes a housing 2000, a motherboard 3000, and an antenna module 1000 provided in this embodiment of this application. The antenna module 1000 is integrated into the housing 2000, to implement a corresponding antenna radiation function. The motherboard 3000 is electrically connected to the antenna module 1000, to supply power to the antenna module 1000. It may be understood that the electronic device 10000 may be a mobile phone, a tablet computer, a computer, a large-screen television, customer-premises equipment (Customer-Premises Equipment, CPE), or any other electronic device 10000 having an antenna. A type of the electronic device 10000 is not specifically limited herein.

As shown in FIG. 1*a* and FIG. 1*b*, for example, the electronic device 10000 is a mobile phone, the housing 2000 of the electronic device 10000 includes a frame 2100 and a rear cover 2200, the frame 2100 and the rear cover 2200 are enclosed to form a receptacle, and the antenna module 1000 is accommodated in the receptacle. It may be understood that, for an electronic device 10000 that is small in size and easy to carry, for example, a mobile phone, an antenna array in the antenna module 1000 usually uses a 1×n (n>1) linear array arrangement form, to effectively avoid mutual interference between other electronic components in the receptacle and the antenna module 1000. It should be understood that the antenna array may alternatively use an men (m>1 and n>1) planar array arrangement form, and may be specifically adjusted according to an overall design and arrangement of the electronic components in the receptacle. The motherboard 3000 is also accommodated in the housing 2000, and a feeding circuit (not shown in the figure) on the motherboard 3000 is connected to the antenna module 1000, to supply power to the antenna module 1000. It should be noted that the antenna module 1000 in the receptacle may be disposed at a position close to the frame 2100 at the top or may be disposed at a position close to the frames 2100 on two sides. The position close to the frame 2100 may be a position at an edge of the motherboard 3000 (as shown in FIG. 1*a*) or an edge of the motherboard 3000 (as shown in FIG. 1*b*) facing the frame 2100, or may be a position attached to the frame 2100. It may be understood that the antenna module 1000 in the receptacle may be disposed at any other position, provided that a corresponding function of transmitting and/or receiving an electromagnetic wave is met. A distribution position of the antenna module 1000 in the electronic device 10000 is not specifically limited herein.

As shown in FIG. 2, for example, the electronic device 10000 is a large-screen television. The housing 2000 of the electronic device 10000 includes a front panel 2300, a middle frame 2400, and a chassis cover 2500. The front panel 2300, the middle frame 2400, and the chassis cover 2500 are enclosed to form a receptacle, and the antenna module 1000 is accommodated in the receptacle. It may be understood that, for an electronic device 10000 that is relatively large in size and does not need to be portable, for example, a large-screen television, an antenna array in the antenna module 1000 may use an m×n (m>1 and n>1) planar array arrangement form. Compared with a 1×n (n>1) linear array arrangement form, when the antenna array uses the m×n (m>1 and n>1) planar array arrangement form, two-dimensional scanning can be implemented. A scanning range of the antenna arrays is larger, so that good antenna radiation performance is implemented. It should be understood that the antenna array may alternatively use a 1×n (n>1) linear array arrangement form, and may be specifically adjusted according to an overall design and arrangement of the electronic components in the receptacle. The motherboard 3000 is also accommodated in the housing 2000, and a feeding circuit (not shown in the figure) on the motherboard 3000 is connected to the antenna module 1000, to supply power to the antenna module 1000.

As shown in FIG. 3, for example, the electronic device 10000 is customer-premises equipment. A structure of the antenna module 1000 in the housing 2000 of the electronic device 10000 is approximately the same as that of the antenna module 1000 in the large-screen television. The motherboard 3000 is also accommodated in the housing 2000, and a feeding circuit (not shown in the figure) on the motherboard 3000 is connected to the antenna module 1000, to supply power to the antenna module 1000. It should be noted that, when the electronic device 10000 is customer-premises equipment, a base 4000 may be further disposed in the housing 2000, to carry the antenna module 1000. In addition, the base 4000 may further control the antenna module 1000 to rotate, to implement a multi-dimensional antenna scanning function. In an embodiment, another circuit element (not shown in the figure) may be disposed in the base 4000, to be electrically connected to the antenna module 1000.

For the electronic device 10000 provided in this embodiment of this application, the antenna module 1000 provided in this embodiment of this application is installed, to meet a gain requirement of low-frequency band scanning, and effectively implement a feature of wide-angle scanning in a high frequency band. For example, in an embodiment, the antenna module 1000 operates in a millimeter-wave frequency band, and simultaneously operates in a high millimeter-wave frequency band and a low millimeter-wave frequency band, to meet a multi-frequency band scanning function. It is to be noted that, in some other embodiments of this application, the electronic device 10000 may include more or fewer components than those shown in the figure, or some components may be combined, or some components may be split, or different component arrangements may be used.

Figure 4:
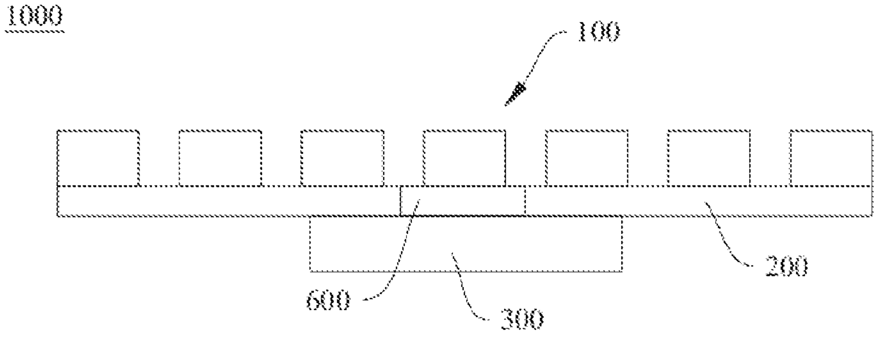
FIG. 4 is a schematic diagram of a structure of an antenna module according to an embodiment of this application.
Figure 5:
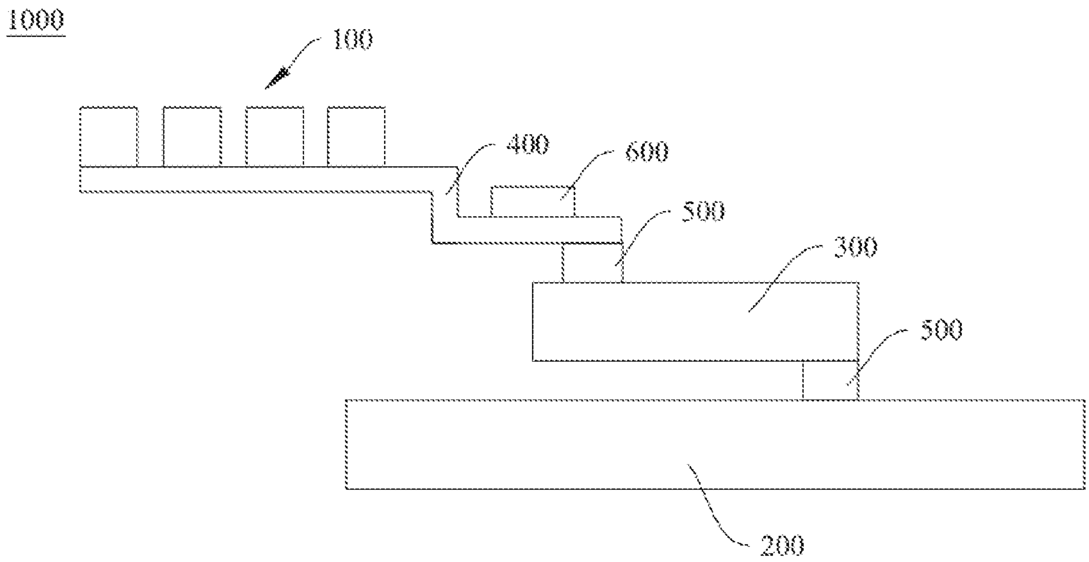
FIG. 5 is a schematic diagram of a structure of an antenna module according to another embodiment.

Refer to FIG. 4 and FIG. 5 together. FIG. 4 is a schematic diagram of a structure of an antenna module according to an embodiment of this application. FIG. 5 is a schematic diagram of a structure of an antenna module according to another embodiment.

An embodiment of this application provides an antenna module 1000. The antenna module 1000 includes a substrate 200, a chip 300, and the antenna array 100 provided in this embodiment of this application. Both the antenna array 100 and the chip 300 are connected to the substrate 200, and the chip 300 is electrically connected to the antenna array 100. It may be understood that the antenna module 1000 provided in this embodiment of this application is a shared-aperture antenna. The shared-aperture antenna means that a plurality of antenna elements of different frequency bands are placed in a same aperture for operation, instead of that antennas of different frequency bands are separately arranged and operate separately. The antenna array 100 is configured to receive or transmit an electromagnetic wave, to implement a corresponding radiation function. The chip 300 is electrically connected to the antenna array 100, to modulate a signal and transmit the signal to the antenna array 100, or demodulate a signal to obtain corresponding information. The substrate 200 may be formed by a printed circuit board (Printed Circuit Board, PCB) or a flexible circuit board (Flexible Printed Circuit, FPC), and the substrate 200 may be a single-layer board or a multi-layer board. The type and structure of the substrate 200 are not specifically limited in this application.

In an embodiment, the antenna module 1000 is a phased-array antenna. The phased array antenna is an antenna whose directivity pattern shape is changed by controlling a feeding phase of an antenna element in an array antenna. The control phase may change the direction of a maximum value of an antenna directivity pattern to implement beam scanning.

It may be understood that there are a plurality of combinations of the substrate 200, the chip 300, and the antenna array 100, provided that a corresponding antenna radiation function can be met. As shown in FIG. 4, in an embodiment, the antenna array 100 is disposed on a surface of the substrate 200, the chip 300 is disposed on a side of the substrate 200 away from the antenna array 100, and a physical line (not shown in the figure) passes through the substrate 200 to connect the chip 300 and the antenna array 100, to implement an electrical connection between the chip 300 and the antenna array 100.

As shown in FIG. 5, in an embodiment, the antenna array 100 and the chip 300 are disposed on a same side of the substrate 200, the antenna array 100 is disposed on a flexible circuit board 400, and is located on a side of the chip 300 away from the substrate 200, and the chip 300 is connected to the antenna array 100 by the flexible circuit board 400. In a specific embodiment, a connector 500 is further disposed between the chip 300, the flexible circuit board, and the substrate 200, to implement a corresponding electrical connection function.

In an embodiment, a combiner 600 is further disposed between the chip 300 and the antenna array 100. The combiner 600 is disposed on the substrate 200 or the flexible circuit board 400. The combiner 600 may combine a plurality of feeding electrical signals of different frequency bands from the chip 300 to form a multi-frequency band combined signal, to transmit the multi-frequency band combined signal to a corresponding antenna element in the antenna array 100, so that a multi-frequency band signal transmission function is implemented.

It may be understood that, the structure of the antenna module 1000 includes, but is not limited to, the foregoing several structures, and may also be a plurality of other structures. In addition, in some other embodiments, the antenna module 1000 may include more or fewer components than those shown in the figure, or some components may be combined, or some components may be split, or different component arrangements may be used. The structure of the antenna module 1000 is not limited herein.

According to the antenna module 1000 provided in embodiments of this application, the antenna array 100 provided in this embodiment of this application is installed, and the chip 300 is electrically connected to the antenna array 100, to transmit a corresponding feeding signal to the antenna array 100, to meet a gain requirement of low-frequency band scanning, and effectively implement a feature of wide-angle scanning in a high frequency band. The following describes in detail the antenna array 100 provided in this embodiment of this application.

Figure 6:
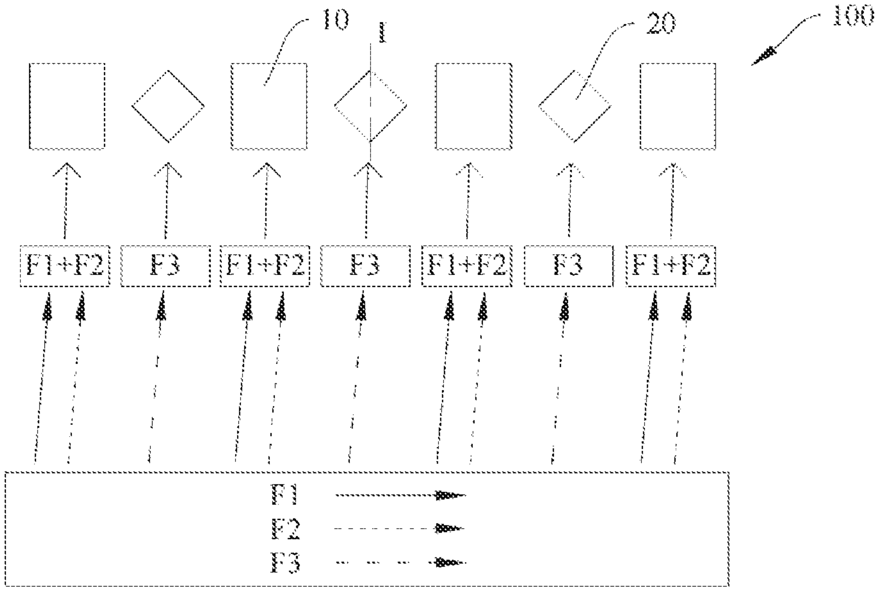
FIG. 6 is a schematic diagram of an arrangement manner and signal transmission of an antenna array according to an embodiment of this application.
Figure 7:
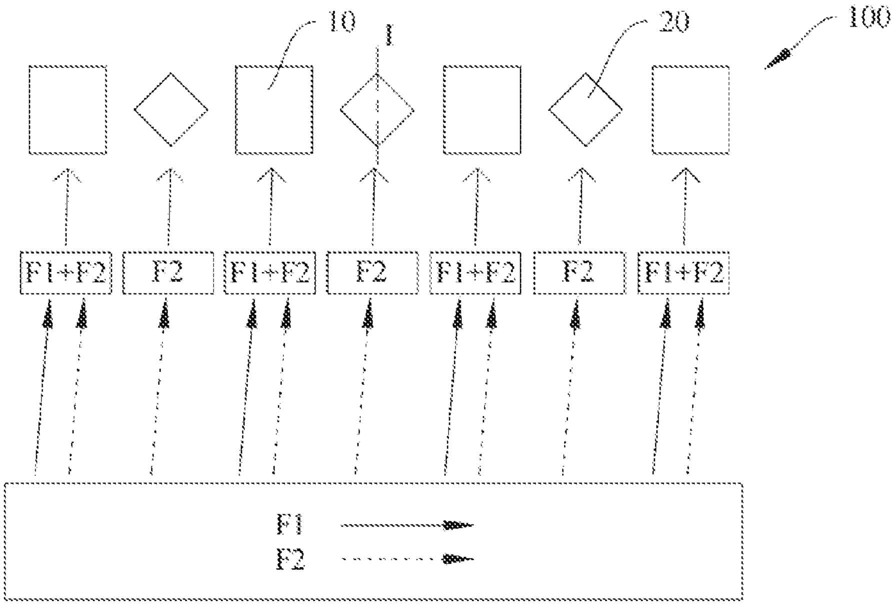
FIG. 7 is a schematic diagram of an arrangement manner and signal transmission of an antenna array according to another embodiment.
Figure 8:
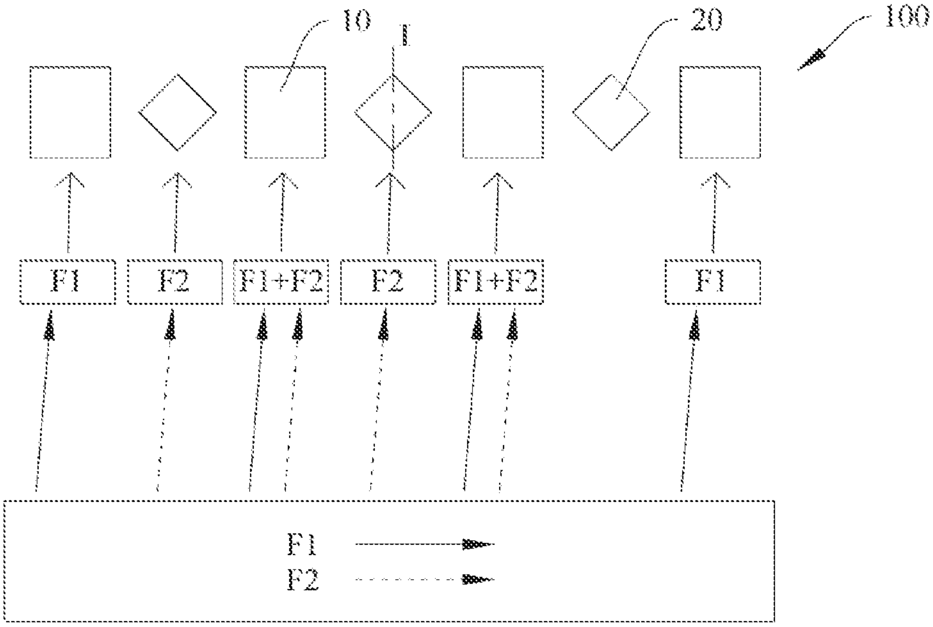
FIG. 8 is a schematic diagram of an arrangement manner and signal transmission of an antenna array according to another embodiment.

Refer to FIG. 6 to FIG. 8. FIG. 6 is a schematic diagram of an arrangement manner and signal transmission of an antenna array according to an embodiment of this application. FIG. 7 is a schematic diagram of an arrangement manner and signal transmission of an antenna array according to another embodiment. FIG. 8 is a schematic diagram of an arrangement manner and signal transmission of an antenna array according to another embodiment.

An embodiment of this application provides an antenna array 100. The antenna array 100 includes first antenna elements 10 and second antenna element(s) 20. A plurality of first antenna elements 10 are provided. The plurality of first antenna elements 10 are arranged at intervals, the second antenna element(s) 20 is(are) disposed between at least two adjacent first antenna elements 10, and a center distance between every two adjacent first antenna elements 10 is within a preset size range, so that a gain of the antenna array 100 in a low frequency band is greater than or equal to a target value.

It may be understood that the center distance between every two adjacent first antenna elements 10 is a distance between a structural center of one first antenna element 10 and a structural center of another adjacent first antenna element 10.

It may be further understood that the first antenna elements 10 and the second antenna element(s) 20 may have a plurality of structures, provided that a corresponding antenna radiation function can be met. For example, each of the first antenna elements 10 and the second antenna element(s) 20 includes at least a radiator and a feeding point. The feeding point is configured to connect to a corresponding feeding circuit, to supply power to the radiator, and the radiator is configured to radiate an electromagnetic wave. Structures of the first antenna elements 10 and the second antenna element(s) 20 are not specifically limited herein.

As shown in FIG. 6, in an embodiment, the plurality of first antenna elements 10 are linearly arranged, and one second antenna element 20 is disposed between every two adjacent first antenna elements 10. In this embodiment, the first antenna elements 10 and the second antenna element(s) 20 are arranged in a staggered manner, and operating frequency bands of the first antenna elements 10 and the second antenna element(s) 20 overlap each other.

The first antenna elements 10 at least operate in a first frequency band and a second frequency band. It may be understood that the first frequency band and the second frequency band may cover various frequency ranges, provided that any frequency in the second frequency band is higher than any frequency in the first frequency band. For example, the first frequency band may be considered as a low frequency band, and the second frequency band may be considered as a high frequency band. For example, both the first frequency band and the second frequency band are 5G millimeter-wave frequency bands. The first frequency band is a full-coverage frequency band that includes a frequency band n257 and a frequency band n258. For example, a frequency range covered by the first frequency band may be 24.25 GHz to 27.5 GHZ. The second frequency band is a full-coverage frequency band that includes a frequency band n259 and a frequency band n260. For example, a frequency range covered by the second frequency band is 37 GHz to 43.5 GHz. It may be understood that, the first frequency band and the second frequency band may cover various frequency ranges, provided that a relatively low frequency band and a relatively high frequency band in the millimeter wave frequency band may be respectively used as the first frequency band and the second frequency band in embodiments of this application. The frequency ranges covered by the first frequency band and the second frequency band are not limited herein. For ease of description, in this embodiment, only an example in which the first frequency band is 24.25 GHz to 27.5 GHz and the second frequency band is 37 GHz to 43.5 GHz is used for detailed description. The antenna array 100 provided in this embodiment can cover a millimeter wave frequency band 24.25 GHz to 29.5 GHZ/37 GHz to 43.5 GHZ.

In an embodiment, a combiner 600 is disposed between each first antenna element 10 and a corresponding feeding circuit. The combiner 600 is configured to combine a feeding signal in the first frequency band and a feeding signal in the second frequency band that are outputted by the feeding circuit, to form a first frequency band-second frequency band combined feeding signal, and transmit the combined feeding signal to the first antenna elements 10, to implement a multi-frequency band signal transmission function.

It may be understood that the first frequency band may be considered as a low frequency band. To enable a gain of the antenna array 100 in the first frequency band to be greater than or equal to the target value to meet a gain requirement of the antenna array 100 in the low frequency band, the center distance between every two adjacent first antenna elements 10 needs to be set within the preset size range. For details, refer to the equivalent gain calculation formula:

$$G \approx \frac{4\pi \cdot S}{\lambda^2} \cdot \eta \tag{1}$$

G represents a gain of the antenna array 100. S represents an aperture area of the antenna array 100, and is positively correlated with a center distance between antenna elements. λ represents a wavelength of an electromagnetic wave corresponding to a center frequency of an operating frequency band of the antenna array 100. The center frequency of the operating frequency band is a frequency corresponding to a center point of the operating frequency band. 17 represents efficiency; and is correlated with material loss and return loss of the antenna array 100.

As can be learned from Formula (1), when the antenna array 100 operates in the first frequency band, when the center distance between every two adjacent first antenna elements 10 is larger, gain performance of the antenna array 100 in the frequency band is better. In addition, it can be learned from a related theory of antenna radiation that when the center distance between every two adjacent first antenna elements 10 is excessively large, performance of the antenna array 100 is reduced. Based on this, the center distance between every two adjacent first antenna elements 10 should be set within the preset size range, to effectively improve a gain of the antenna array 100 in the first frequency band.

In a specific embodiment, the target value of the gain is 8 dBi, and the gain of the antenna array 100 in the first frequency band is enabled to be greater than or equal to 8 dBi, to meet a gain requirement of the first frequency band (for example, a low frequency band in a millimeter wave frequency band). Under this requirement, the preset size range is greater than or equal to 0.45 times a wavelength corresponding to the first frequency band and less than or equal to 0.8 times the wavelength corresponding to the first frequency band. The wavelength corresponding to the first frequency band is a wavelength $\lambda_1$ corresponding to a center frequency of the first frequency band, and the center frequency of the first frequency band is a frequency corresponding to a center point of the first frequency band. Based on this, a physical length range of the center distance between every two adjacent first antenna elements 10 is $0.45\lambda_1$ to $0.8\lambda_1$, and a corresponding electrical length range is 0.45 to 0.8. In a specific embodiment, a physical length of the center distance between every two adjacent first antenna elements 10 is $0.5\lambda_1$.

The second antenna element(s) (20) at least operate in a third frequency band. The third frequency band may cover various frequency ranges, provided that the third frequency band at least partially overlaps the second frequency band. It may be understood that, compared with the first frequency band, an overlapping frequency band between the second frequency band and the third frequency band may also be considered as a high frequency band. However, in this embodiment, because both the first antenna elements 10 and the second antenna element(s) 20 operate in the overlapping frequency band, and a center distance between each first antenna element 10 and each second antenna element 20 is small, the antenna array 100 can effectively implement a feature of wide-angle scanning in the overlapping frequency band. The center distance between the first antenna element 10 and the second antenna element 20 is a distance between a structural center of the first antenna element 10 and a structural center of the second antenna element 20. Refer to the formula:

$$\Delta\phi = \frac{2\pi d \sin\theta}{\lambda} \quad (2)$$

θ represents a scanning angle of the antenna array 100, d represents a center distance between two adjacent antenna elements. λ represents a wavelength corresponding to a center frequency of an operating frequency band of the antenna array 100. The center frequency of the operating frequency band is a frequency corresponding to a center point of the operating frequency band. Δϕ represents a phase difference between two adjacent antenna elements.

It can be learned from Formula (2) and the related theory that a maximum value of the phase difference is 180°. When the phase difference remains unchanged, a value of d is in inverse proportion to a value of 0. When the first antenna elements 10 operate in the overlapping frequency band between the second frequency band and the third frequency band, the second antenna element(s) 20 that also operate in the overlapping frequency band is inserted between two adjacent first antenna elements 10, so that the value of d can be effectively reduced, to increase the value of 0, and a scanning angle of the antenna array 100 in the overlapping frequency band can be increased, to effectively implement a feature of wide-angle scanning in a high frequency band. It should be further noted that, with reference to Formula (1), to enable a gain of the antenna array 100 in the foregoing overlapping frequency band to meet a corresponding requirement, the center distance between each first antenna element 10 and each second antenna element 20 that are adjacent should be set to an appropriate value.

In a specific embodiment, the center distance between each first antenna element 10 and the second antenna element 20 that are adjacent is greater than or equal to 0.3 times a wavelength corresponding to the overlapping frequency band, and is less than or equal to 0.45 times the wavelength corresponding to the overlapping frequency band. The wavelength corresponding to the overlapping frequency band is a wavelength $\lambda_0$ corresponding to a center frequency of the overlapping frequency band, and the center frequency of the overlapping frequency band is a frequency corresponding to a center point of the overlapping frequency band. Based on this, a physical length range of the center distance between the first antenna element 10 and the second antenna element 20 that are adjacent is $0.3\lambda_0$ to $0.45\lambda_0$, and a corresponding electrical length range is 0.3 to 0.45. When the center distance between the first antenna element and the second antenna element 20 that are adjacent is within the foregoing size range, the gain 10 of the antenna array 100 in the foregoing overlapping frequency band can meet a corresponding requirement, and the scanning angle of the antenna array 100 in the overlapping frequency band can be improved, so that spatial coverage is supplemented for scanning in a high frequency band, and a feature of large-angle and wide-angle scanning in the high frequency band is effectively implemented. In a specific embodiment, a physical length of the center distance between every two adjacent first antenna elements 10 is $0.37\lambda_0$.

It should be noted that, when the antenna array 100 performs multi-frequency band radiation, a feeding signal corresponding to each frequency band is transmitted to the antenna array 100, to implement a corresponding radiation function. Specifically; a first feeding signal F1 within a range of the first frequency band is transmitted to the first antenna elements 10, so that the first antenna elements 10 perform radiation in the first frequency band. A second feeding signal F2 within a range of the second frequency band is transmitted to the first antenna elements 10, so that the first antenna elements 10 may further perform radiation in the second frequency band. A third feeding signal F3 within a range of the third frequency band is transmitted to the second antenna element(s) 20, so that the second antenna element(s) 20 perform radiation in the third frequency band.

As shown in FIG. 7, in an embodiment, to meet a corresponding wireless communication requirement, the third frequency band may be a full-coverage frequency band including a frequency band n259 and a frequency band n260. For example, a frequency range covered by the third frequency band is 37 GHz to 43.5 GHZ. It may be understood that, in this embodiment, the third frequency band and the second frequency band cover a same frequency range. For example, it may be considered that both the first antenna elements 10 and the second antenna element(s) 20 may operate in the second frequency band, so that the antenna array 100 can effectively implement a feature of wide-angle scanning in a frequency band of 37 GHz to 43.5 GHz. For ease of description, this embodiment is described in detail only by using an example in which the second antenna element(s) 20 also operate in the second frequency band (37 GHz to 43.5 GHZ). For example, the second feeding signal F2 within the range of the second frequency band is transmitted to the first antenna elements 10 and the second antenna element(s) 20, so that both the first antenna elements 10 and the second antenna element(s) 20 may perform radiation in the second frequency band.

It may further be understood that, when a plurality of first antenna elements 10 in the antenna array 100 are linearly arranged, and one second antenna element 20 is disposed between every two adjacent first antenna elements 10, the antenna array 100 may be axisymmetrically distributed with respect to a virtual symmetry axis 1. The virtual symmetry axis 1 is perpendicular to an extension direction of the antenna array 100, and the first antenna elements 10 and the second antenna element(s) 20 are alternately arranged on two sides of the symmetry axis 1. In addition, the center distance between every two adjacent first antenna elements 10 is the same, and a center distance between every two adjacent second antenna elements 20 is the same. It is to be noted that when the antenna array 100 is symmetrically distributed, scanning symmetry of the antenna array 100 can be effectively improved, so that the antenna array 100 has good scanning performance. It should be further noted that a same feeding signal may be fed into antenna elements that are symmetrically distributed with respect to the foregoing symmetry axis 1, so that the antenna array 100 is symmetrical in structure and also symmetrical in signal distribution, to further improve the scanning symmetry of the antenna array 100.

It may be understood that "perpendicular" in embodiments of this application may not be strict perpendicularity: To be specific, in the antenna array 100 provided in embodiments of this application, an included angle between the virtual symmetry axis 1 and the extension direction of the antenna array 100 is close to 90°, but may not be 90°. For example, when the angle is within an angle range of 80° to 100° (for example, 85° to 95°, or 88° to 92°), it may be considered as "perpendicular". An error in the included angle between the virtual symmetry axis 1 in the antenna array 100 provided in embodiments of this application and the extension direction of the antenna array 100 caused by a process is acceptable to a person skilled in the art, and the included angle does not affect implementation of the objectives of embodiments of this application. It may be further understood that "symmetrical" in embodiments of this application may not be strict symmetry and may have a particular deviation, which is also acceptable to a person skilled in the art.

In the foregoing symmetrical distribution, center distances between the second antenna element 20 and the two adjacent first antenna elements 10 are the same. In a specific embodiment, the center distance between two adjacent first antenna elements 10 is 5.6 mm, and the center distance between the first antenna element 10 and the second antenna element 20 that are adjacent is 2.8 mm. It may be understood that when the center distances between the second antenna element 20 and the two adjacent first antenna elements 10 are both 2.8 mm, the scanning symmetry of the antenna array 100 can be improved, and the antenna array 100 can be further enabled to meet a gain requirement of scanning in the first frequency band (24.25 GHz to 27.5 GHZ) and the second frequency band (37 GHz to 43.5 GHZ), and effectively implement a feature of wide-angle scanning in the second frequency band.

It should be noted that, generally, a quantity of output ports of a feeding signal of each frequency band on the chip 300 is fixed. As shown in FIG. 8, in an embodiment, four output ports are provided for a feeding signal of each frequency band, and the antenna array 100 may simultaneously feed four first feeding signals F1 and four second feeding signals F2. It may be understood that, in this embodiment, if a quantity of feeding signals needs to be increased, correspondingly, a quantity of chips 300 needs to be increased, which causes an increase in costs. Based on this, generally, a quantity of first feeding signals F1 and a quantity of second feeding signals F2 that are fed into the antenna array 100 at the same time remain four.

It may be understood that, when both the quantity of the first feeding signal F1 and the quantity of the second feeding signal F2 remain four, only two first antenna elements 10 in the antenna array 100 can feed a combined signal formed by combining the first feeding signal F1 and the second feeding signal F2, and the other two first antenna elements 10 feed only the first feeding signal F1. In addition, only two second antenna elements 20 in the antenna array 100 can feed a second feeding signal F2, and a signal is not fed into the remaining second antenna elements 20, which are used as a dummy element, and the dummy element in this application is an antenna element that is not fed into a signal. It should be noted that, to ensure that the antenna array 100 can meet a feature of wide-angle scanning in the second frequency band and improve scanning symmetry of the antenna array 100, corresponding signals should be fed into the first antenna elements 10 and the second antenna elements 20 in a signal feeding manner shown in FIG. 7. It should be further noted that a signal is not fed into the second antenna elements 20 used as dummy elements, therefore basically does not have a radiation function, and may be omitted. To ensure structural symmetry of the antenna array 100, the second antenna elements 20 used as dummy elements may be reserved.

Figure 9:
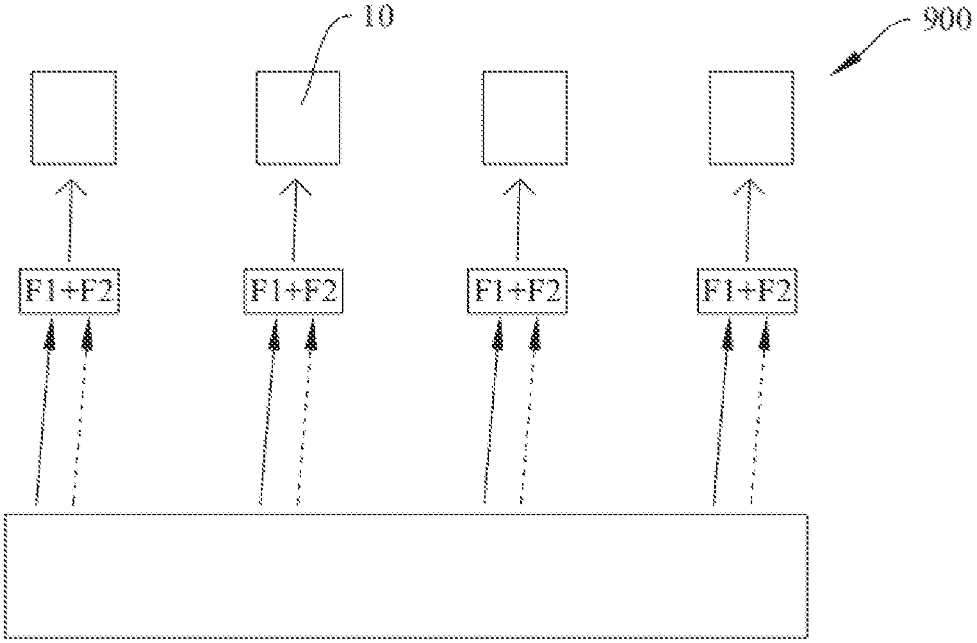
FIG. 9 is a schematic diagram of a structure of an antenna array.

Refer to FIG. 8 and FIG. 9. FIG. 9 is a schematic diagram of a structure of an antenna array 900.

It can be learned from FIG. 9 that the antenna array 900 includes a plurality of first antenna elements 10, and each first antenna element 10 feeds a combined signal formed by combining a first feeding signal F1 and a second feeding signal F2. A center distance between two adjacent first antenna elements 10 is adjusted, to change gains and scanning angles of the antenna array 900 in a first frequency band and a second frequency band. Table 1 shows parameter simulation results of the antenna array 900 and the antenna array 100 in the foregoing embodiment in different frequency bands.

TABLE 1

Parameter simulation results of the antenna array 900 and the antenna array 100 in the foregoing embodiment in different frequency bands

| Antenna array type | Antenna array 900 | | Antenna array 100 | |
|---|---|---|---|---|
| Frequency band (GHz) | 24.25-29.5 | 37-43.5 | 24.25-29.5 | 37-43.5 |
| Gain (dBi) | 6.8-9 | 10-12 | 8-10 | 8-9 |
| Scanning angle (°) | 30-38 | 21-25 | 25-30 | 39-48 |
| Center distance between antenna elements (mm) | 4.5 | | 5.6 | 2.8 |

It can be learned from Table 1 that, in the first frequency band, for example, in a frequency range from 24.25 GHz to 29.5 GHZ, compared with the antenna array 900, a gain of the antenna array 100 can remain greater than or equal to 8 dBi, to meet a gain requirement of a low frequency band. In addition, a scanning angle of the antenna array 100 in the first frequency band is slightly less than a scanning angle of the antenna array 900 in the first frequency band, but the requirement of the scanning angle of the low frequency band can still be met.

In the second frequency band, for example, in a frequency range from 37 GHz to 43.5 GHz, the gain of the antenna array 100 is slightly lower than that of the antenna array 900, but can still remain greater than or equal to 8 dBi, to meet a gain requirement of a high frequency band. In addition, the scanning angle of the antenna array 100 in the second frequency band is far greater than the scanning angle of the antenna array 900 in the second frequency band, to effectively implement a feature of wide-angle scanning in a high frequency band.

In summary, the antenna array 100 can meet a multi-frequency band gain requirement, and a scanning angle in a high frequency band is increased, to effectively implement a feature of wide-angle scanning in a high frequency band.

According to the antenna array 100 provided in this embodiment of this application, the plurality of first antenna elements 10 are arranged at intervals, and the center distance between every two adjacent first antenna elements 10 is set within the preset size range, so that the gain of the antenna array 100 in the first frequency band is greater than or equal to the target value, to meet a requirement of a low frequency band gain. In addition, the second antenna element(s) 20 is/are disposed between at least two adjacent first antenna elements 10, and the third frequency band of the second antenna element(s) 20 at least partially overlaps the second frequency band of the first antenna elements 10, so that a distance between antenna elements in a high frequency band is reduced. Therefore, the scanning angle of the antenna array 100 in a high frequency band is improved, to effectively implement a feature of wide-angle scanning in a high frequency band.

Figure 10:
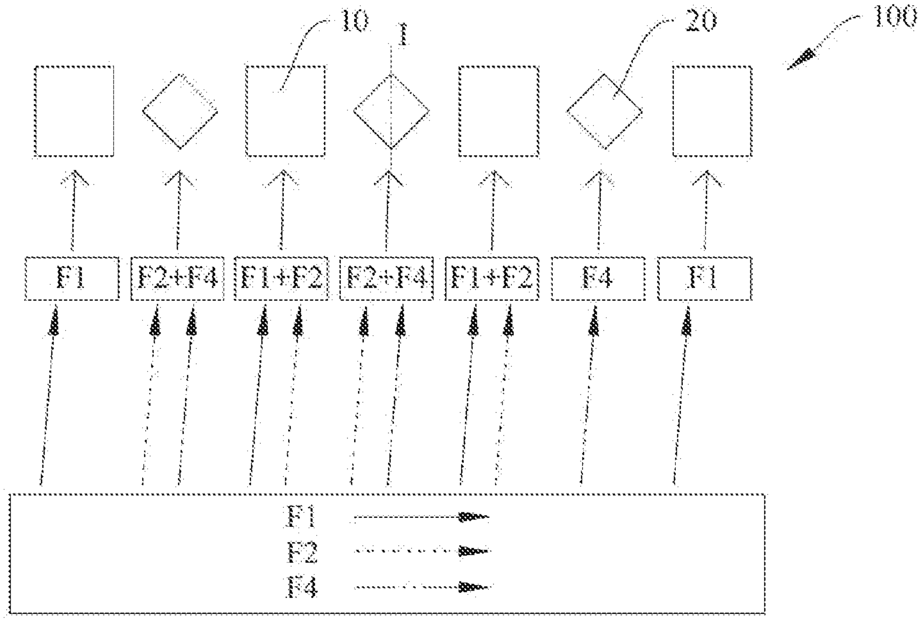
FIG. 10 is a schematic diagram of an arrangement manner and signal transmission of an antenna array according to another embodiment.

FIG. 10 is a schematic diagram of an arrangement manner and signal transmission of an antenna array according to another embodiment.

In an embodiment, second antenna element(s) 20 is/are multi-frequency band antenna elements, and the second antenna element(s) 20 operate in a second frequency band, and may also operate in another frequency band, so that an antenna array 100 formed by first antenna elements and the second antenna element(s) 20 is not limited to a dual-frequency band antenna array 100, and may be a multi-frequency band antenna array 100.

As shown in FIG. 10, for example, the second antenna element(s) 20 operate in the second frequency band and a fourth frequency band. A first feeding signal F1 within a range of a first frequency band is transmitted to the first antenna elements 10, so that the first antenna elements 10 perform radiation in the first frequency band. A second feeding signal F2 within a range of the second frequency band is transmitted to the first antenna elements 10 and the second antenna element(s) 20, so that the first antenna elements 10 and the second antenna element(s) 20 perform radiation in the second frequency band. A fourth feeding signal F4 in a range of the fourth frequency band is transmitted to the second antenna element(s) 20, so that the second antenna element(s) 20 may further perform radiation in the fourth frequency band. In this way, the antenna array 100 may operate in the first frequency band, the second frequency band, and the fourth frequency band.

It may be understood that the fourth frequency band may be a radar frequency band. For example, the antenna array 100 implements a radar radiation function in the fourth frequency band. It may be understood that, different from a communication frequency band, a frequency of the radar frequency band is high. For example, any frequency in the fourth frequency band is higher than any frequency in the second frequency band. In addition, because radar radiation has a low requirement on a scanning angle, even if a center distance between adjacent second antenna elements 20 is small, the fourth feeding signal F4 may also be fed to implement a corresponding radar radiation function. The center distance between adjacent second antenna elements 20 is a distance between a structural center of one second antenna element 20 and a structural center of the other adjacent second antenna element 20. In a specific embodiment, a frequency range covered by the fourth frequency band is 57 GHz to 64 GHz. It may be understood that the fourth frequency band may cover various frequency ranges, which are not described one by one herein.

In an embodiment, a combiner 600 is disposed between each second antenna element 20 and a corresponding feeding circuit, and the combiner is configured to combine a feeding signal in the second frequency band (the second feeding signal F2) and a feeding signal in the fourth frequency band (the fourth feeding signal F4) that are outputted by the feeding circuit, to form a second frequency band-fourth frequency band combined feeding signal, and transmit the combined feeding signals to the second antenna element 20, to implement a multi-frequency band signal transmission function.

Figure 11:
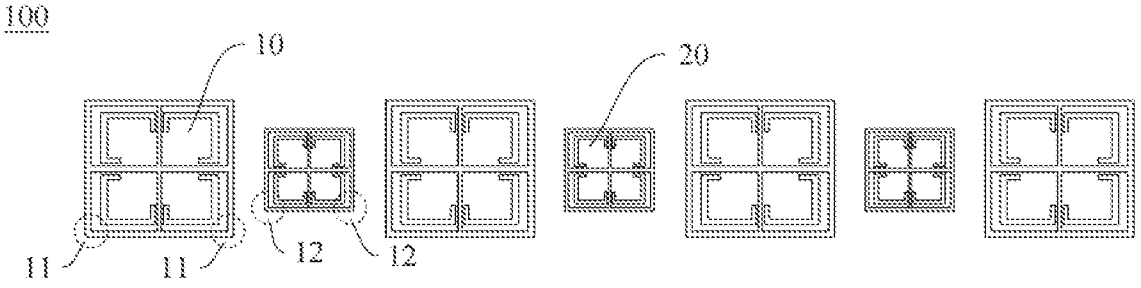
FIG. 11 is a schematic diagram of a structure of an antenna array formed by patch antennas.
Figure 12:
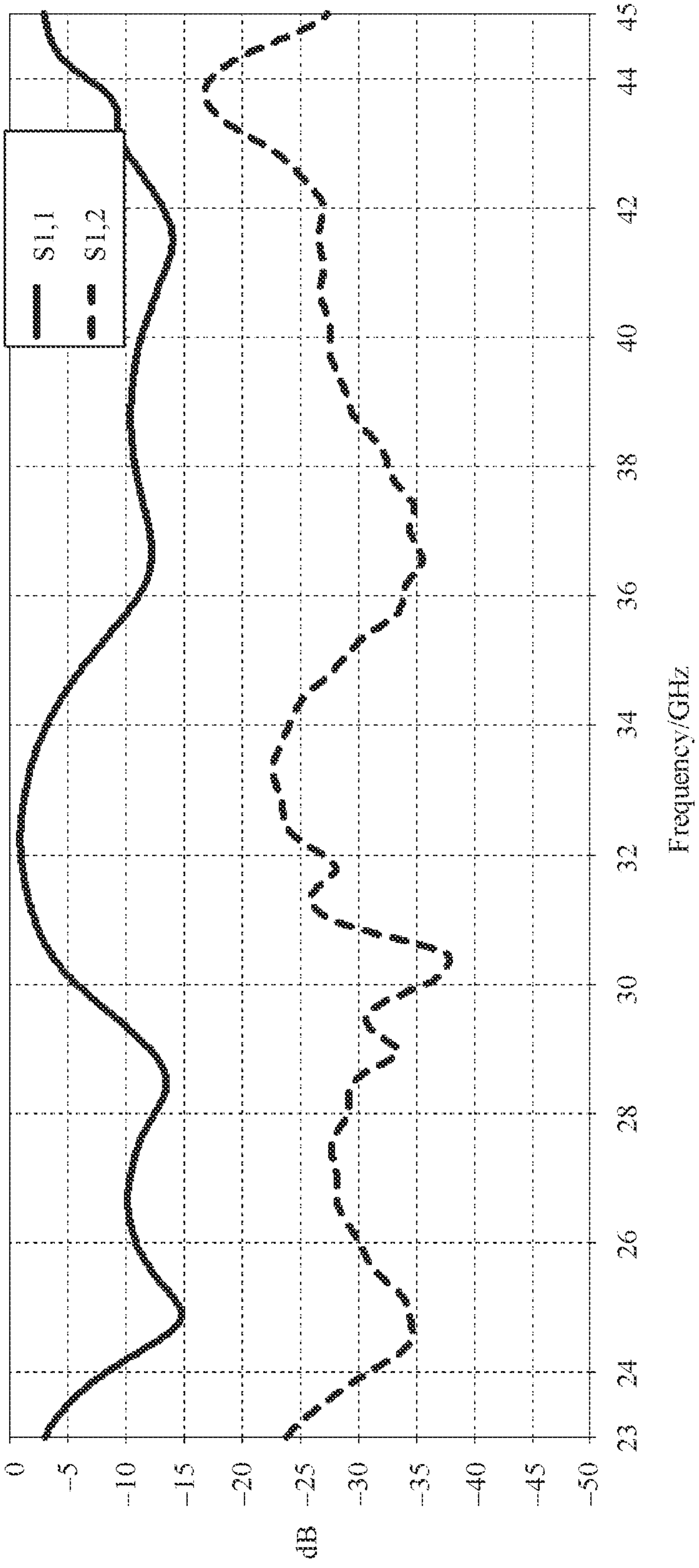
FIG. 12 is a diagram of an echo curve and an isolation curve that are of some frequency bands and that are obtained by simulating the antenna array shown in FIG. 11.
Figure 13:
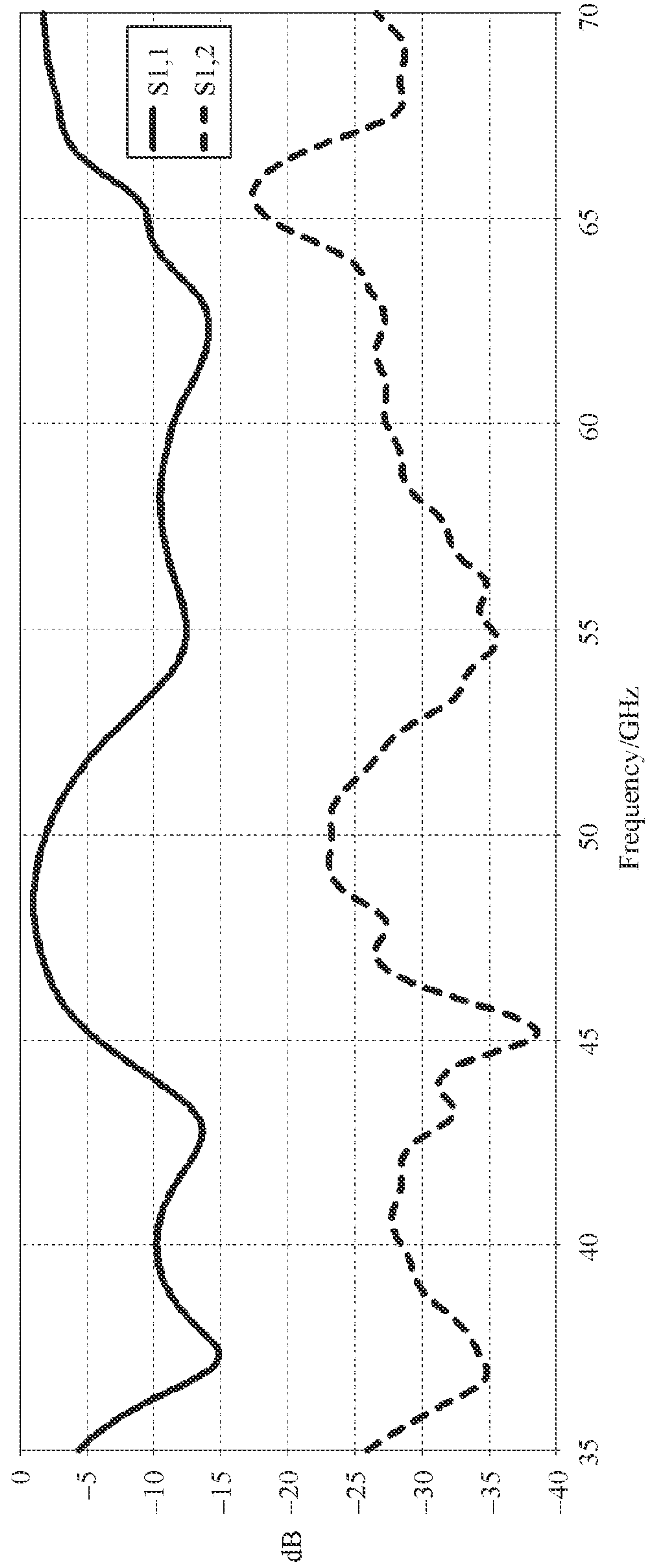
FIG. 13 is a diagram of an echo curve and an isolation curve that are of some frequency bands and that are obtained by simulating the antenna array shown in FIG. 11.

Refer to FIG. 11 to FIG. 13 together. FIG. 11 is a schematic diagram of a structure of an antenna array formed by patch antennas FIG. 12 is a diagram of an echo curve and an isolation curve that are of some frequency bands and that are obtained by simulating the antenna array shown in FIG. 11. FIG. 13 is a diagram of an echo curve and an isolation curve that are of some frequency bands and that are obtained by simulating the antenna array shown in FIG. 11.

As shown in FIG. 11, in an embodiment, both the first antenna elements 10 and the second antenna element(s) 20 are patch antennas, and the antenna array 100 is formed by patch antennas. In a specific embodiment, two first feeding ports 11 are disposed on each first antenna element 10, the two first feeding ports 11 are disposed at an interval, and are separately disposed at two corners of the first antenna element 10. One first feeding port 11 is connected to one feeding line (not shown in the figure), the other first feeding port 11 is connected to another feeding line (not shown in the figure), and the two feeding lines are perpendicular to each other and jointly feed a signal into the first antenna element 10, to form a dual-polarized patch antenna. Two second feeding ports 12 are disposed on each second antenna element 20. The two second feeding ports 12 are disposed at an interval and are separately disposed at two corners of the second antenna element 20. One second feeding port 12 is connected to one feeding line, the other second feeding port 12 is connected to another feeding line, and the two feeding lines are perpendicular to each other and jointly feed a signal into the second antenna element 20, to form a dual-polarized patch antenna. It should be noted that the dual-polarized antenna may be, for example, an antenna that combines two polarization directions +45° and −45° being orthogonal to each other and that operates in a transmit/receive duplex mode at the same time.

It may be understood that the first feeding ports 11 and the second feeding ports 12 may be disposed at other positions of the antenna elements, provided that a corresponding function requirement can be met. Positions of the first feeding port 11 and the second feeding port 12 are not specifically limited herein. It may be further understood that "perpendicular" in this embodiment may not be strict perpendicularity. To be specific, an included angle between two feeding lines mentioned in this embodiment of this application is close to 90°, but may not be 90°. For example, when the included angle is within an angle range of 80° to 100°, it may be considered that the two feeding lines are perpendicular.

FIG. 12 and FIG. 13 are diagrams of an echo curve and an isolation curve obtained by simulating an antenna array 100 formed by patch antennas. A solid line S1,1 is an echo curve, and a dashed line S1,2 is an isolation curve between feeding ports. A horizontal coordinate is a frequency in GHz, and a vertical coordinate is in dB.

As shown in FIG. 12, a return loss of an antenna of the antenna array 100 in frequency bands of 24.25 GHz to 29.5 GHz and 37 GHz to 43.5 GHz is less than −10 dB, and antenna isolation is less than −25 dB. As shown in FIG. 13, an antenna return loss of the antenna array 100 in frequency bands of 37 GHz to 43.5 GHz and 57 GHz to 64 GHz is less than −10 dB, and antenna isolation is less than −25 dB. In summary, it can be learned that the antenna array 100 formed by patch antennas can meet antenna performance requirements in all the first frequency band, the second frequency band, and the fourth frequency band.

Figure 14:
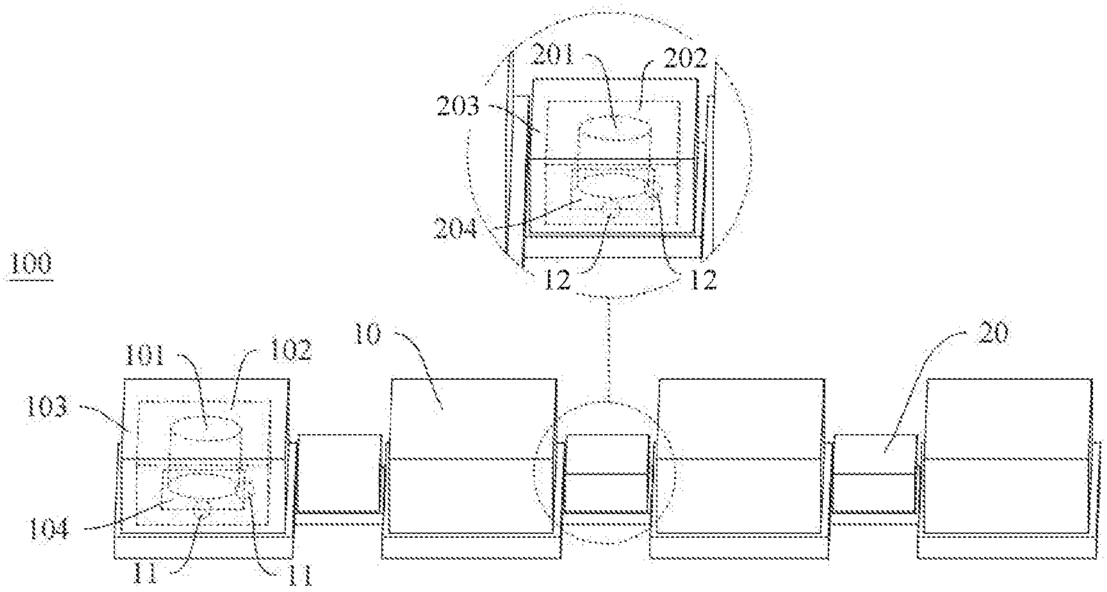
FIG. 14 is a schematic diagram of a structure of an antenna array formed by dielectric resonant antennas.
Figure 15:
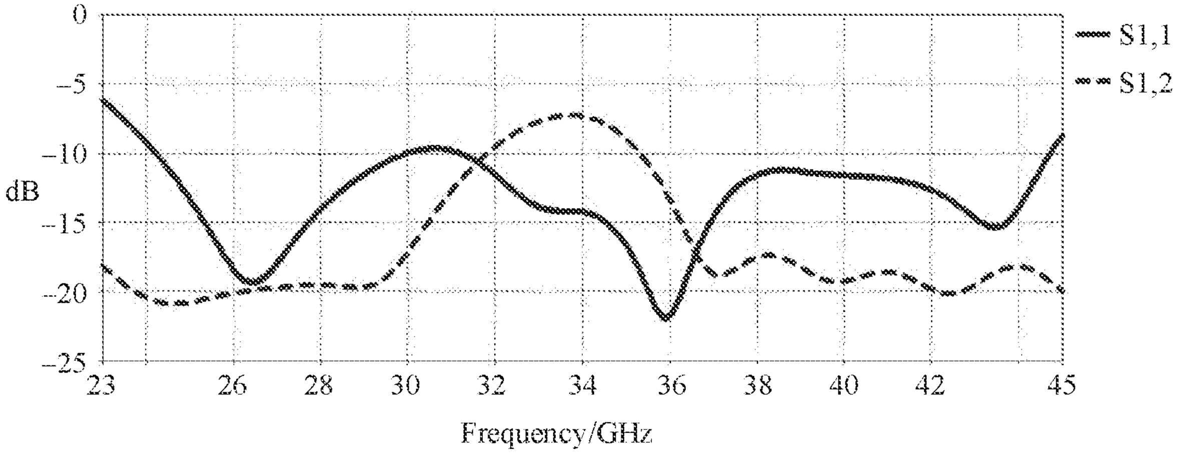
FIG. 15 is a diagram of an echo curve and an isolation curve that are of some frequency bands and that are obtained by simulating the antenna array shown in FIG. 14.
Figure 16:
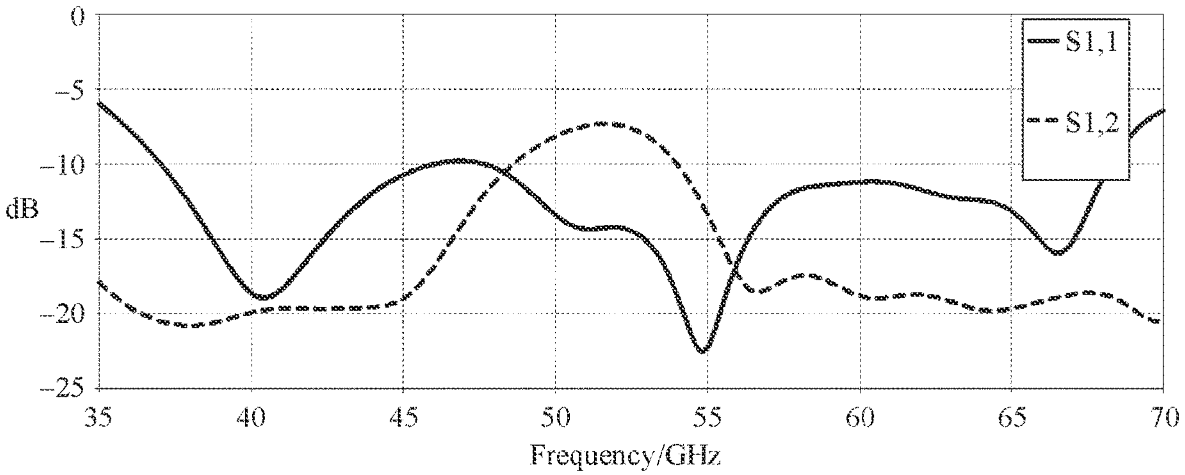
FIG. 16 is a diagram of an echo curve and an isolation curve that are of some frequency bands and that are obtained by simulating the antenna array shown in FIG. 14.

Refer to FIG. 14 to FIG. 16 together. FIG. 14 is a schematic diagram of a structure of an antenna array formed by dielectric resonant antennas. FIG. 15 is a diagram of an echo curve and an isolation curve that are of some frequency bands and that are obtained by simulating the antenna array shown in FIG. 14. FIG. 16 is a diagram of an echo curve and an isolation curve that are of some frequency bands and that are obtained by simulating the antenna array shown in FIG. 14.

As shown in FIG. 14, in an embodiment, both the first antenna elements 10 and the second antenna element(s) 20 are dielectric resonant antennas, and the antenna array 100 is formed by dielectric resonant antennas. In a specific embodiment, each first antenna element 10 includes a first metal column 101, a first non-metal dielectric block 102, and a second non-metal dielectric block 103 that are sequentially sleeved, and a first metal sheet 104 disposed at a bottom of the first metal column 101. Two first feeding ports 11 are disposed on the first metal sheet 104. The two first feeding ports 11 are disposed at an interval, and are separately disposed on two sides of the first metal sheet 104. One first feeding port 11 is connected to one feeding line (not shown in the figure), the other first feeding port 11 is connected to another feeding line (not shown in the figure), and the two feeding lines are perpendicular to each other and jointly feed a signal into the first antenna element 10, to form a dual-polarized dielectric resonant antenna. Each second antenna element 20 includes a second metal column 201, a third non-metal dielectric block 202, and a fourth non-metal dielectric block 203 that are sequentially sleeved, and a second metal sheet 204 disposed at a bottom of the second metal column 201. Two second feeding ports 12 are disposed on the second metal sheet 204, and the two second feeding ports 12 are disposed at an interval, and are separately disposed on two sides of the second metal sheet 204. One second feeding port 12 is connected to one feeding line (not shown in the figure), the other second feeding port 12 is connected to another feeding line (not shown in the figure), and the two feeding lines are perpendicular to each other and jointly feed a signal into the second antenna element 20, to form a dual-polarized dielectric resonant antenna.

It may be understood that the first feeding ports 11 and the second feeding ports 12 may be disposed at other positions of the antenna elements, provided that a corresponding function requirement can be met. Positions of the first feeding port 11 and the second feeding port 12 are not specifically limited herein. It may be further understood that “perpendicular” in this embodiment may not be strict perpendicularity. To be specific, an included angle between two feeding lines mentioned in this embodiment of this application is close to 90°, but may not be 90°. For example, when the included angle is within an angle range of 80° to 100°, it may be considered that the two feeding lines are perpendicular.

FIG. 15 and FIG. 16 are diagrams of an echo curve and an isolation curve obtained by simulating an antenna array 100 formed by dielectric resonant antennas. A solid line S1,1 is an echo curve, and a dashed line S1,2 is an isolation curve between feeding ports. A horizontal coordinate is a frequency in GHz, and a vertical coordinate is in dB.

As shown in FIG. 15, a return loss of an antenna of the antenna array 100 in frequency bands of 24.25 GHz to 29.5 GHz and 37 GHz to 43.5 GHz is less than −10 dB, and antenna isolation is less than −25 dB. As shown in FIG. 16, an antenna return loss of the antenna array 100 in frequency bands of 37 GHz to 43.5 GHz and 57 GHz to 64 GHz is less than −10 dB, and antenna isolation is less than −25 dB. In summary, it can be learned that the antenna array 100 formed by dielectric resonant antennas can also meet antenna performance requirements in all the first frequency band, the second frequency band, and the fourth frequency band.

In summary, regardless of whether the first antenna elements 10 and the second antenna element(s) 20 are patch antennas or dielectric resonant antennas, an antenna array 100 formed by the first antenna elements and the second antenna element(s) can meet an antenna performance requirement in a corresponding frequency band. It may be further understood that types of the first antenna elements 10 and the second antenna element(s) 20 include, but are not limited to, patch antennas and dielectric resonant antennas, and may be any other antenna type that meets a corresponding function requirement. The types of the first antenna elements 10 and the second antenna element(s) 20 are not specifically limited herein.

Figure 17:
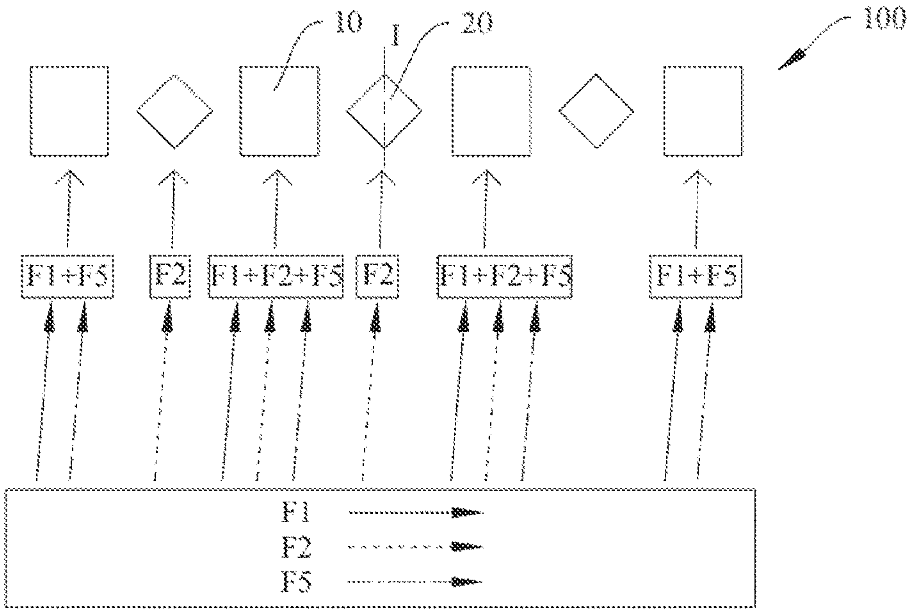
FIG. 17 is a schematic diagram of an arrangement manner and signal transmission of an antenna array according to another embodiment.

FIG. 17 is a schematic diagram of an arrangement manner and signal transmission of an antenna array according to another embodiment.

In an embodiment, first antenna elements 10 are multi-frequency band antenna elements, and the first antenna elements 10 operate in a first frequency band and a second frequency band, and may also operate in another frequency band, so that an antenna array 100 formed by the first antenna elements 10 and the second antenna element(s) 20 is not limited to a dual-frequency band antenna array 100, and may be a multi-frequency band antenna array 100.

As shown in FIG. 17, for example, the first antenna elements 10 operate in the first frequency band, the second frequency band, and a fifth frequency band. A first feeding signal F1 within a range of a first frequency band is transmitted to the first antenna elements 10, so that the first antenna elements 10 perform radiation in the first frequency band. A second feeding signal F2 within a range of the second frequency band is transmitted to the first antenna elements 10 and the second antenna element(s) 20, so that the first antenna elements 10 and the second antenna element (s) 20 perform radiation in the second frequency band. A fifth feeding signal F5 in a range of the fifth frequency band is transmitted to the first antenna elements 10, so that the first antenna elements 10 may further perform radiation in the fifth frequency band. In this way, the antenna array 100 may operate in the first frequency band, the second frequency band, and the fifth frequency band.

It may be understood that the fifth frequency band may cover various frequency ranges, and a quantity and a distribution of the first antenna elements 10 into which the fifth feeding signal F5 is fed may be adjusted based on a size of the frequency range covered by the fifth frequency band, so that a gain and a scanning angle of the antenna array 100 in the fifth frequency band can meet a corresponding requirement. For example, the first frequency band is 24.25 GHz to 29.5 GHz, the second frequency band is 37 GHz to 43.5 GHZ, the fifth frequency band is 57 GHz to 64 GHz, and a center distance between two adjacent first antenna elements 10 is 5.6 mm. It may also be understood that, the first antenna elements 10 may further operate in another frequency band other than the first frequency band, the second frequency band, and the fifth frequency band. A frequency band and a range in which the first antenna elements 10 operate are not limited.

Figure 18:
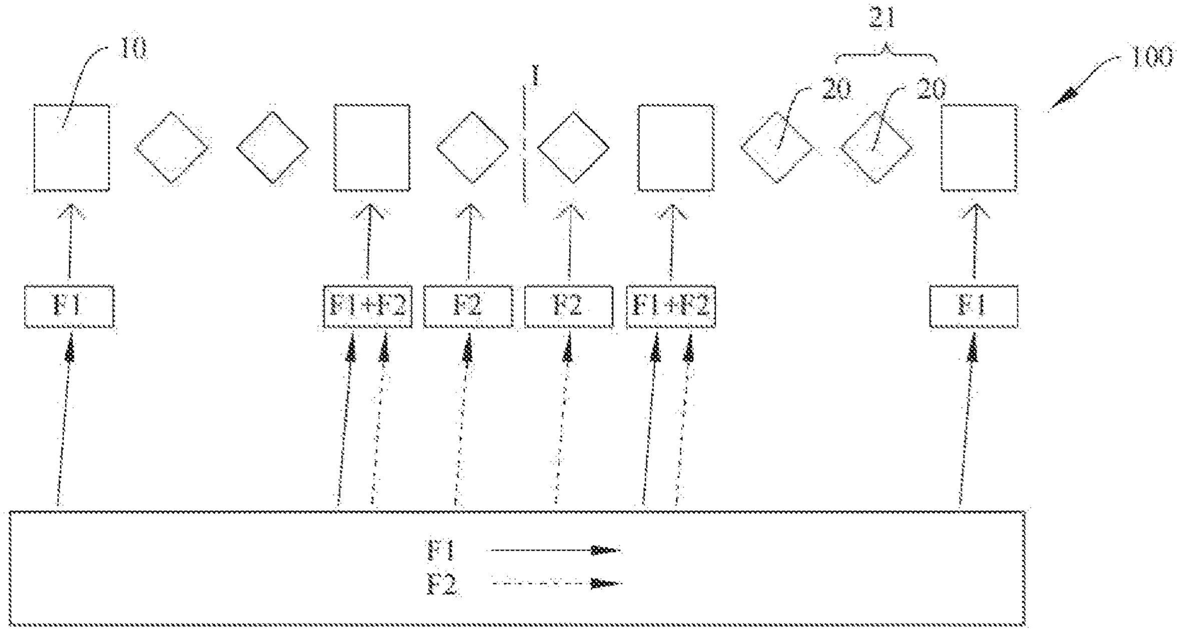
FIG. 18 is a schematic diagram of an arrangement manner and signal transmission of an antenna array according to another embodiment.

FIG. 18 is a schematic diagram of an arrangement manner and signal transmission of an antenna array according to another embodiment.

In an embodiment, a plurality of second antenna elements 20 are disposed between every two adjacent first antenna elements 10. It may be understood that when the first antenna elements 10 operate in the first frequency band and the second frequency band, the second antenna elements 20 operate in the second frequency band, and a phase difference between a frequency covered by the first frequency band and a frequency covered by the second frequency band is large, the plurality of second antenna elements 20 may be inserted between two adjacent first antenna elements 10, to improve radiation performance of the antenna array 100. It may be further understood that, in the foregoing structure, the center distance between every two adjacent second antenna elements 20 may be equal to the center distance between each first antenna element 10 and each second antenna element 20 that are adjacent, so that symmetry of the antenna array 100 in the second frequency band is effectively improved.

As shown in FIG. 18, in a specific embodiment, two second antenna elements 20 are disposed between every two adjacent first antenna elements 10, and a center distance between each first antenna element 10 and each second antenna element 20 that are adjacent is greater than or equal to 0.3 times a wavelength corresponding to a second frequency band and less than or equal to 0.45 times the wavelength corresponding to the second frequency band. The wavelength corresponding to the second frequency band is a wavelength corresponding to a center frequency of the second frequency band, and the center frequency of the second frequency band is a frequency corresponding to a center point of the second frequency band. It may be understood that, under the foregoing center distance requirement, a scanning angle of the antenna array 100 in the second frequency band can be effectively increased, to effectively implement a feature of wide-angle scanning in a high frequency band. For example, in this embodiment, the first frequency band is 24.25 GHz to 29.5 GHz. and the second frequency band is 57 GHz to 64 GHZ In another embodiment, the first frequency band is 24.25 GHz to 29.5 GHz, and the second frequency band is 122 GHz to 123 GHZ. It may be understood that 122 GHz to 123 GHZ belong to a radar frequency band. When an antenna array 100 operates in the frequency band, a requirement on a scanning angle is relatively low. Even if an electrical length of a center distance between adjacent antenna elements is small, a corresponding function requirement can be met.

In this embodiment, the antenna array 100 may also be axisymmetrically distributed with respect to a virtual symmetry axis 1. The virtual symmetry axis 1 is perpendicular to an extension direction of the antenna array 100. A plurality of second antenna elements 20 between two adjacent first antenna elements 10 are combined to form a second antenna element group 21. The first antenna elements 10 and the second antenna element group 21 are alternately arranged on two sides of a symmetry axis 11, and a center distance between every two adjacent first antenna elements 10 is the same, a center distance between every two adjacent second antenna elements 20 in the second antenna element group 21 is the same, and a center distance between each first antenna element 10 and each second antenna element 20 that are adjacent is the same. It is to be noted that when the antenna array 100 is symmetrically distributed, scanning symmetry of the antenna array 100 can be effectively improved, so that the antenna array 100 has good scanning performance. It should be further noted that a same feeding signal may be fed into antenna elements that are symmetrically distributed with respect to the foregoing symmetry axis 11, so that the antenna array 100 is symmetrical in structure and also symmetrical in signal distribution, to further improve the scanning symmetry of the antenna array 100.

Figure 19:
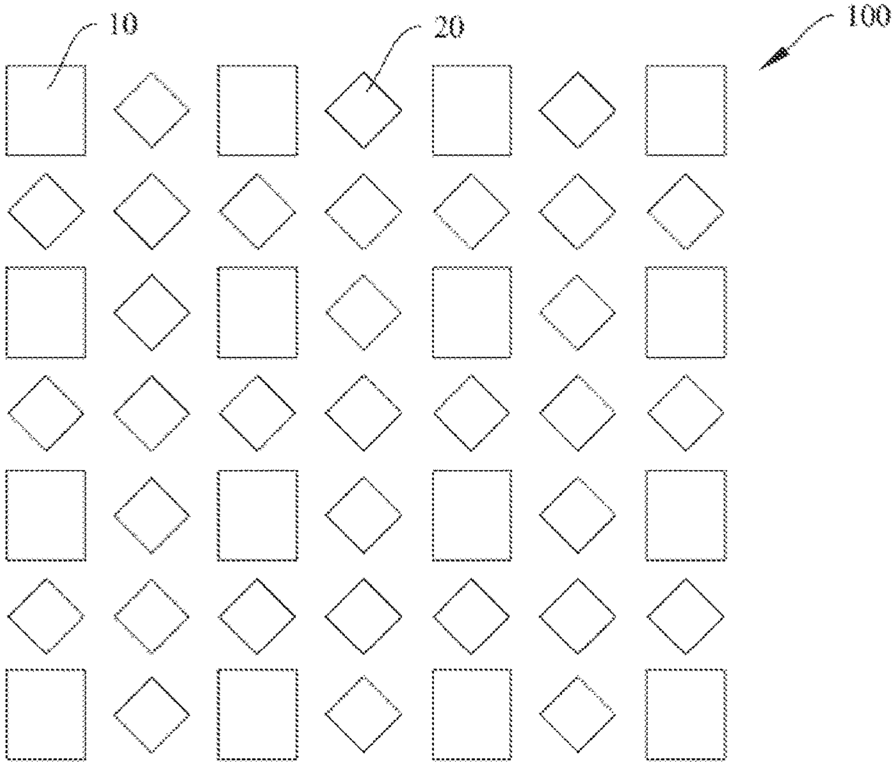
FIG. 19 is a schematic diagram of an arrangement manner of an antenna array according to another embodiment.

FIG. 19 is a schematic diagram of an arrangement manner of an antenna array according to another embodiment.

As shown in FIG. 19, in an embodiment, the plurality of first antenna elements 10 are planarly arranged, and at least one second antenna element 20 is disposed between every two adjacent first antenna elements 10. It may be understood that, when the antenna array 100 is arranged in an m×n (m>1, n>1) planar array, the antenna array 100 usually includes a large quantity of first antenna elements 10 and a large quantity of second antenna elements 20, so that good antenna radiation performance can be obtained.

Figure 20:
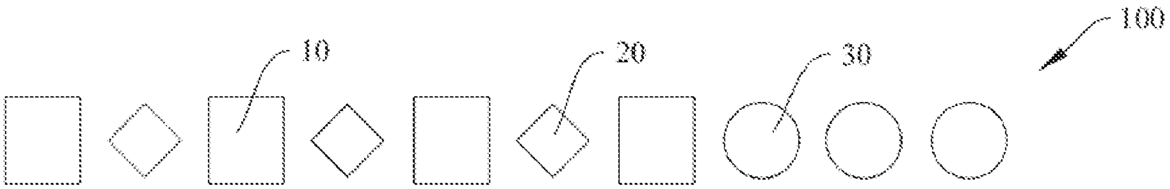
FIG. 20 is a schematic diagram of an arrangement manner of an antenna array according to another embodiment.
Figure 21:
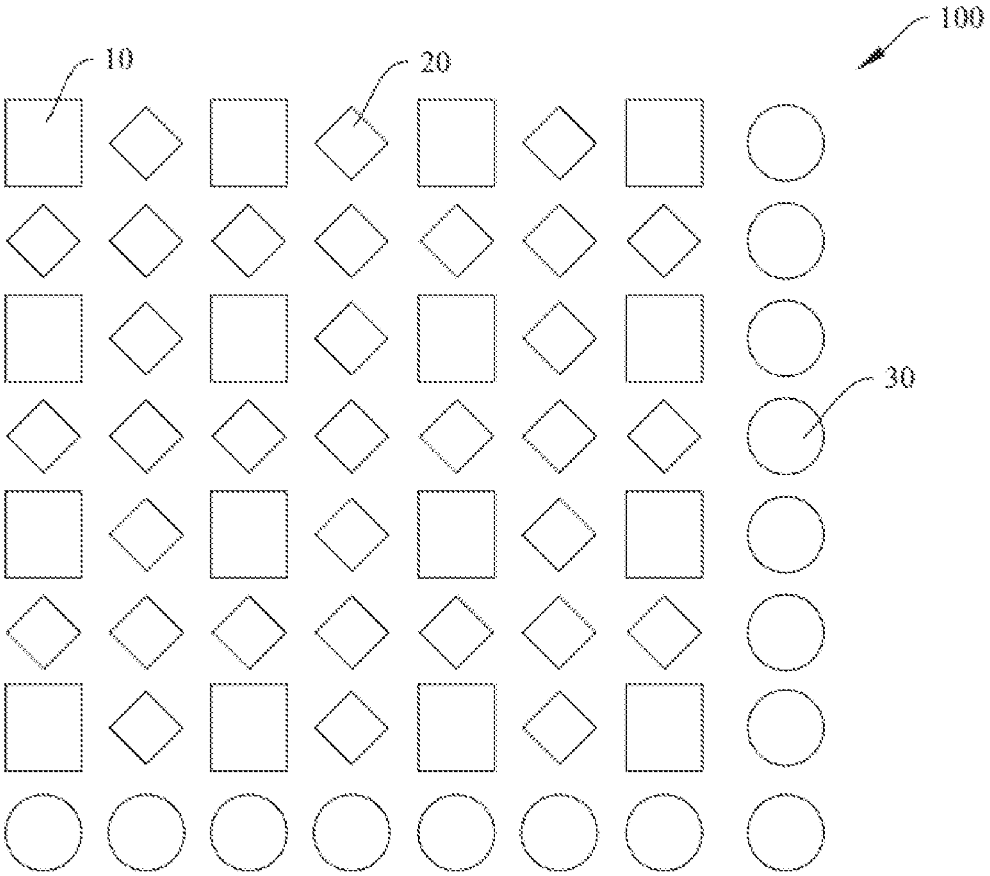
FIG. 21 is a schematic diagram of an arrangement manner of an antenna array according to another embodiment.

Refer to FIG. 20 and FIG. 21 together. FIG. 20 is a schematic diagram of an arrangement manner of an antenna array according to another embodiment. FIG. 21 is a schematic diagram of an arrangement manner of an antenna array according to another embodiment.

In an embodiment, an antenna array 100 further includes a third antenna element 30. The third antenna element 30 are spaced from first antenna elements 10 and second antenna element(s) 20. The third antenna element 30, the first antenna elements 10, and the second antenna element(s) 20 are separated from each other, and operate in different frequency bands, to implement respective radiation functions. It may be understood that, in this embodiment, it may be considered that some first antenna elements 10 or some second antenna element(s) 20 in the antenna array 100 are replaced with the third antenna element(s) 30, and an operating frequency band of the third antenna element(s) 30 is different from operating frequency bands of the first antenna elements 10 and the second antenna element(s) 20. For example, the operating frequency band of the third antenna element(s) 30 is 57 GHz to 64 GHZ, so that the antenna array 100 implements various radiation functions. As shown in FIG. 20, the antenna array 100 provided in this embodiment may be linearly arranged. As shown in FIG. 21, the antenna array 100 provided in this embodiment may also be planarly arranged.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments of this application and features in embodiments may be mutually combined provided that no conflict occurs. Therefore, the protection scope of this application shall be subject to the protection scope of the claims.

What is claimed is:

1. An antenna array, comprising:

a plurality of first antenna elements operating at least in a first frequency band and a second frequency band, wherein any frequency in the second frequency band is higher than any frequency in the first frequency band, wherein the plurality of first antenna elements are linearly arranged at intervals, and wherein a first center distance between every two adjacent first antenna elements is within a preset size range such that a gain of the antenna array in the first frequency band is greater than or equal to a target value, and wherein the preset size range is greater than or equal to 0.45 times a first wavelength corresponding to the first frequency band and less than or equal to 0.8 times the first wavelength; and at least one second antenna element operating at least in a third frequency band, wherein the third frequency band at least partially overlaps the second frequency band, wherein the at least one second antenna element comprises a plurality of second antenna elements disposed between every two adjacent first antenna elements, and wherein a third center distance between every two adjacent second antenna elements is equal to a second center distance between each of the first antenna elements and each of the second antenna elements that are adjacent.

2. The antenna array of claim 1, wherein the target value is 8 decibels isotropic (dBi).

3. The antenna array of claim 1, wherein only one of the at least one second antenna element is disposed between every two adjacent first antenna elements, and wherein the second center distance is the same.

4. The antenna array of claim 3, wherein a frequency range in which the second frequency band overlaps the third frequency band is an overlapping frequency band, and wherein the second center distance is greater than or equal to 0.3 times a second wavelength corresponding to the overlapping frequency band and is less than or equal to 0.45 times the second wavelength.

5. The antenna array of claim 4, wherein the first frequency band is 24.25 gigahertz (GHz) to 29.5 GHZ, and wherein the second frequency band and the third frequency band are both 37 GHz to 43.5 GHz.

6. The antenna array of claim 1, wherein two second antenna elements are disposed between every two adjacent first antenna elements, wherein a frequency range in which the second frequency band overlaps the third frequency band is an overlapping frequency band, and wherein the second center distance is greater than or equal to 0.3 times a second wavelength corresponding to the overlapping frequency band and is less than or equal to 0.45 times the second wavelength.

7. The antenna array of claim 1, wherein the first frequency band is 24.25 gigahertz (GHz) to 29.5 GHZ, and wherein the second frequency band and the third frequency band are both 122 GHz to 123 GHz.

8. The antenna array of claim 1, wherein the antenna array is axisymmetrically distributed with respect to a virtual symmetry axis, wherein the first antenna elements and the at least one second antenna element are alternately arranged on two sides of the virtual symmetry axis, wherein the first center distance between every two adjacent first antenna elements is the same, and wherein the third center distance.

9. The antenna array of claim 1, wherein the first antenna elements and the at least one second antenna element are patch antennas or dielectric resonant antennas.

10. An antenna apparatus comprising:

a substrate;

a chip coupled to the substrate; and an antenna array coupled to the substrate and electrically connected to the chip, wherein the antenna array comprises:

a plurality of first antenna elements operating at least in a first frequency band and a second frequency band, wherein any frequency in the second frequency band is higher than any frequency in the first frequency band, wherein the plurality of first antenna elements are arranged at intervals, and wherein a first center distance between every two adjacent first antenna elements is within a preset size range such that a gain of the antenna array in the first frequency band is greater than or equal to a target value; and at least one second antenna element operating at least in a third frequency band, wherein the third frequency band at least partially overlaps the second frequency band, and wherein the at least one second antenna element is disposed between at least two adjacent first antenna elements.

11. The antenna apparatus of claim 10, wherein the chip is configured to:

transmit a first feeding signal or a second feeding signal to a first antenna element of the plurality of first antenna elements, wherein a first frequency of the first feeding signal falls within a range of the first frequency band, and wherein a second frequency of the second feeding signal falls within a range of the second frequency band; and transmit a third feeding signal to the at least one second antenna element, wherein a third frequency of the third feeding signal falls within a range of the third frequency band.

12. An electronic device comprising:

an antenna array, wherein the antenna array comprises:

a plurality of first antenna elements operating at least in a first frequency band and a second frequency band, wherein any frequency in the second frequency band is higher than any frequency in the first frequency band, wherein the plurality of first antenna elements are arranged at intervals, and wherein a first center distance between every two adjacent first antenna elements is within a preset size range such that a gain of the antenna array in the first frequency band is greater than or equal to a target value, wherein the preset size range is greater than or equal to 0.45 times a first wavelength corresponding to the first frequency band and less than or equal to 0.8 times the first wavelength, and wherein the target value is 8 decibels isotropic (dBi); and at least one second antenna element operating at least in a third frequency band, wherein the third frequency band at least partially overlaps the second frequency band, wherein the at least one second antenna element is disposed between at least two adjacent first antenna elements, wherein two second antenna elements are disposed between every two adjacent first antenna elements, wherein a frequency range in which the second frequency band overlaps the third frequency band is an overlapping frequency band, and wherein a second center distance between a first antenna element of the plurality of first antenna elements and the second antenna element that are adjacent is greater than or equal to 0.3 times a second wavelength corresponding to the overlapping frequency band and is less than or equal to 0.45 times the second wavelength.

13. The electronic device of claim 12, further comprising an antenna apparatus, wherein the antenna apparatus comprises:

a substrate coupled to the antenna array; and a chip coupled to the substrate and electrically connected to the antenna array.

14. The electronic device of claim 12, wherein the first antenna elements are linearly arranged.

15. The electronic device of claim 12, wherein the target value is 8 decibels isotropic (dBi).

16. The electronic device of claim 12, wherein only one of the at least one second antenna element is disposed between every two adjacent first antenna elements, and wherein the second center distance is the same.

17. The electronic device of claim 16, wherein the first frequency band is 24.25 gigahertz (GHz) to 29.5 GHZ, and wherein the second frequency band and the third frequency band are both 37 GHz to 43.5 GHz.

18. The electronic device of claim 12, wherein the first frequency band is 24.25 gigahertz (GHz) to 29.5 GHZ, and wherein the second frequency band and the third frequency band are both 122 GHz to 123 GHz.

* * * * *